(12) United States Patent
Kawaguchi et al.

(10) Patent No.: US 7,587,472 B2
(45) Date of Patent: Sep. 8, 2009

(54) RESOURCE MANAGEMENT SYSTEM

(75) Inventors: Yuichi Kawaguchi, Kasuya-Gun (JP);
Satoshi Ando, Munakata-Gun (JP);
Masao Oomoto, Kasuya-Gun (JP); Yuji Shimizu, Koga (JP)

(73) Assignee: Panasonic Corporation, Osaka (JP)

( * ) Notice: Subject to any disclaimer, the term of this patent is extended or adjusted under 35 U.S.C. 154(b) by 736 days.

(21) Appl. No.: 10/669,686

(22) Filed: Sep. 25, 2003

(65) Prior Publication Data

US 2004/0122970 A1 Jun. 24, 2004

(30) Foreign Application Priority Data

Sep. 27, 2002 (JP) ............................ 2002-283682

(51) Int. Cl.
*G06F 15/16* (2006.01)
*G06F 15/173* (2006.01)

(52) U.S. Cl. .................. 709/220; 709/203; 709/223; 709/226; 709/238; 709/249

(58) Field of Classification Search .............. 709/229, 709/313, 245, 203, 223, 226, 238, 249, 220; 370/356
See application file for complete search history.

(56) References Cited

U.S. PATENT DOCUMENTS

| 6,363,434 | B1 | | 3/2002 | Eytchison | |
|---|---|---|---|---|---|
| 6,502,101 | B1 | * | 12/2002 | Verprauskus et al. | 707/101 |
| 6,523,696 | B1 | * | 2/2003 | Saito et al. | 709/223 |
| 6,876,668 | B1 | * | 4/2005 | Chawla et al. | 370/468 |
| 7,120,147 | B2 | * | 10/2006 | Derango et al. | 370/390 |
| 2003/0023711 | A1 | * | 1/2003 | Parmar et al. | 709/223 |

FOREIGN PATENT DOCUMENTS

| EP | 1 119 134 | | 7/2001 |
|---|---|---|---|
| JP | 10-308776 | | 11/1998 |
| JP | 2000-269998 | | 9/2000 |
| JP | 2000269998 A | * | 9/2000 |
| JP | 2002-051076 | | 2/2002 |

(Continued)

OTHER PUBLICATIONS

Bushmitch et al "Resource management and scheduling for the QoS-Capable home network wireless access point" disclosing a proposed algorithm for provides delay and packet loss service guarantees to a diverse set of application traffic classes 2004, IEEE pp. 7-12.*

(Continued)

*Primary Examiner*—Larry D Donaghue
*Assistant Examiner*—Karen C Tang
(74) *Attorney, Agent, or Firm*—Wenderoth, Lind & Ponack, L.L.P.

(57) ABSTRACT

A resource management server that manages information concerning the resource reservation status and the information of groups of all electronic equipments connected to hubs. When an electronic equipment is newly connected to a port of one of the hubs, the electronic equipment issues a resource request and the group information to the resource management server. The resource management server sets up a network path between the newly connected electronic equipment and the other electronic equipments belonging to the same group as the newly connected electronic equipment, and judges if the resource request can be accepted on the setup network path.

23 Claims, 29 Drawing Sheets

FOREIGN PATENT DOCUMENTS

| | | | | |
|---|---|---|---|---|
| JP | 2002051076 A | * | 2/2002 | |
| WO | 03/003658 | | 1/2003 | |

OTHER PUBLICATIONS

R. Yavatkar et al., "IETF RFC 2814: A Protocol for RSVP-based Admission Control over IEEE 802-style networks" IETF RFC 2814, May 1, 2000, Retrieved from the Internet: <URL:http://www.ietf.org/rfc/rfc2814.txt?n umber=2814> retrieved on Aug. 1, 2002.

M. L. Kar et al., "IEEE 1394-cable's home digital network interface of choice", Consumer Electronics, 1999, ICCE. International Conference on Los Angeles, CA, USA Jun. 22-24, 1999, Piscataway, NJ USA, IEEE, US, Jun. 22, 1999, pp. 34-35.

T. Bauge, R. Egan et al., "QoS Provisioning in an IP-based Studio Production Network" Proceedings of PGNET 2000, 'Online! Jun. 2000, pp. 1-8, Retrieved from the Internet: <URL:http://citeseer.nj.nec.com/cache/papers/cs/13835/http:zSzzSzwww.ee.surrey.ac.ukzSzPersonalzSzG.Pavl ouzSzPublicationzSzConference-paperszSzBauge-00.pdf/bauge00qos.pdf>retrieved on Jan. 19, 2004!.

* cited by examiner

Fig. 3

| electronic equip. name | A (SDTV) | B (HDTV) | C (TEL) | D (VTR) | | E (HDDVTR) | |
|---|---|---|---|---|---|---|---|
| group | AV | AV | TEL | AV | | AV | |
| function | picture display | picture display | sound | recording picture | replaying picture | recording picture | replayig picture |
| network receiving capacity | 10Mbps | 30Mbps | 256kbps | 10Mbps | none | 22Mbps | none |
| receiving service capacity | ch.1 | ch.1 | ch.1 | ch.1 | none | ch.1 | none |
| network sending capacity | none | none | 256kbps | none | 10Mbps | none | 10Mbps |
| sending service capacity | none | none | ch.1 | none | ch.1 | none | ch.1 |

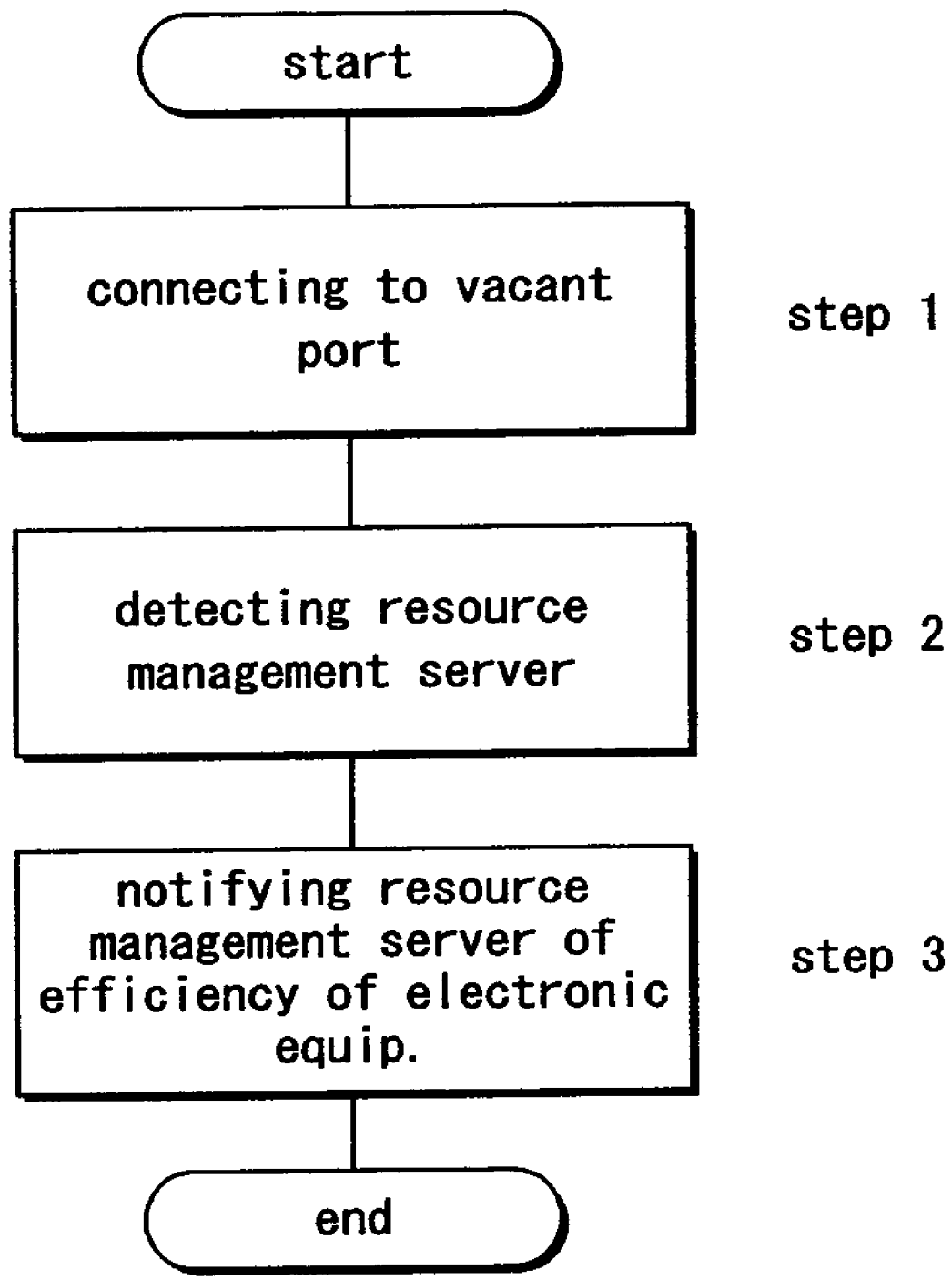

Fig. 5(a)

| router | | | | | |
|---|---|---|---|---|---|
| port | connecting location | available bandwidth (input) | reserved bandwidth (input) | available bandwidth (output) | reserved bandwidth (output) |
| port1 | port1 of first hub | 100M | 1M | 100M | 11M |
| port2 | port2 of second hub | 100M | 10M | 100M | 0 |
| port3 | ADSL circuit | 8M | 0 | 1M | 0 |

Fig. 5(b)

| first hub | | | | | |
|---|---|---|---|---|---|
| port | connecting location | available bandwidth (input) | reserved bandwidth (input) | available bandwidth (output) | reserved bandwidth (output) |
| port1 | port1 of router | 100M | 11M | 100M | 1M |
| port2 | electronic equip. A | 100M | 0 | 100M | 10M |
| port3 | electronic equip. B | 100M | 0 | 100M | 10M |
| port4 | electronic equip. C | 100M | 1M | 100M | 1M |
| port5 | none | 100M | 0 | 100M | 0 |

Fig. 5(c)

| second hub | | | | | |
|---|---|---|---|---|---|
| port | connecting location | available bandwidth (input) | reserved bandwidth (input) | available bandwidth (output) | reserved bandwidth (output) |
| port1 | port2 of router | 100M | 0 | 100M | 10M |
| port2 | electronic equip. D | 100M | 10M | 100M | 0 |
| port3 | none | 100M | 0 | 100M | 0 |
| port4 | none | 100M | 0 | 100M | 0 |
| port5 | none | 100M | 0 | 100M | 0 |

Fig. 6

| electronic equip. name | port | insufficient bandwidth |
|---|---|---|
| second hub | port1 | 5Mbps |

Fig. 7

| electronic equip. name | port |
|---|---|
| second hub | port1 |

Fig. 11(a)

| router | | | | | |
|---|---|---|---|---|---|
| port | connecting location | available bandwidth (input) | reserved bandwidth (input) | available bandwidth (output) | reserved bandwidth (output) |
| port1 | port1 of first hub | 100M | 1M | 100M | 33M |
| port2 | port2 of second hub | 100M | 32M | 100M | 0 |
| port3 | ADSL circuit | 8M | 0 | 1M | 0 |

Fig. 11(b)

| first hub | | | | | |
|---|---|---|---|---|---|
| port | connecting location | available bandwidth (input) | reserved bandwidth (input) | available bandwidth (output) | reserved bandwidth (output) |
| port1 | port1 of router | 100M | 33M | 100M | 1M |
| port2 | electronic equip. A | 100M | 0 | 100M | 22M |
| port3 | electronic equip. B | 100M | 0 | 100M | 22M |
| port4 | electronic equip. C | 100M | 1M | 100M | 1M |
| port5 | none | 100M | 0 | 100M | 0 |

Fig. 11(c)

| second hub | | | | | |
|---|---|---|---|---|---|
| port | connecting locatioin | available bandwidth (input) | reserved bandwidth (input) | available bandwidth (output) | reserved bandwidth (output) |
| port1 | port2 of router | 100M | 0 | 100M | 32M |
| port2 | electronic equip. D | 100M | 10M | 100M | 22M |
| port3 | electronic equip. E | 100M | 22M | 100M | 10M |
| port4 | none | 100M | 0 | 100M | 0 |
| port5 | none | 100M | 0 | 100M | 0 |

Fig. 20
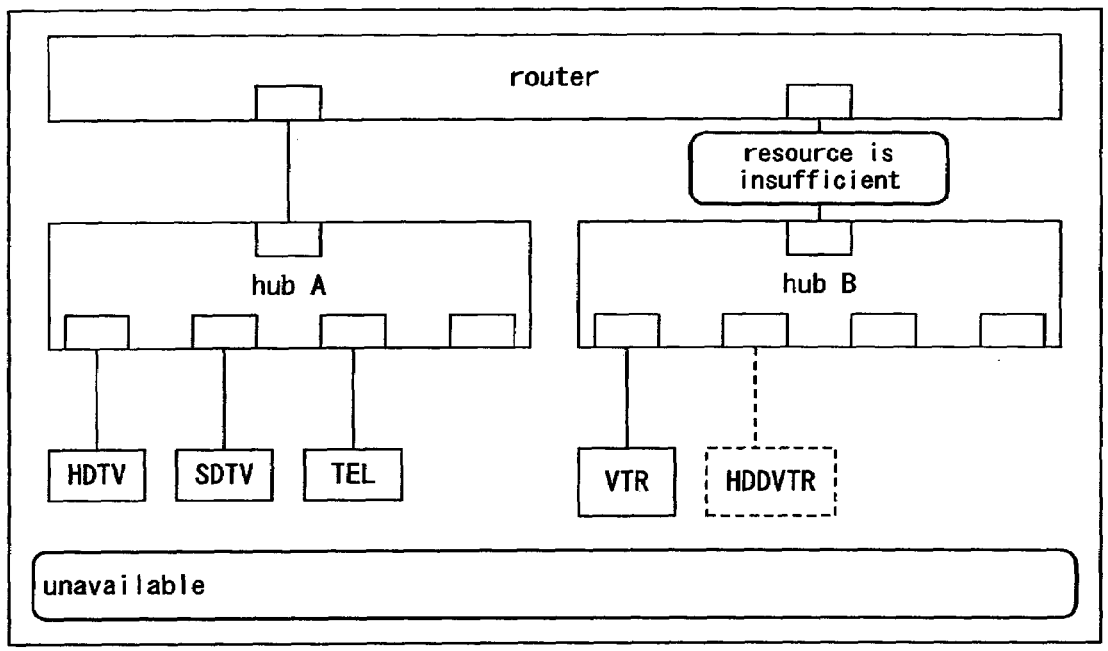
Fig. 21
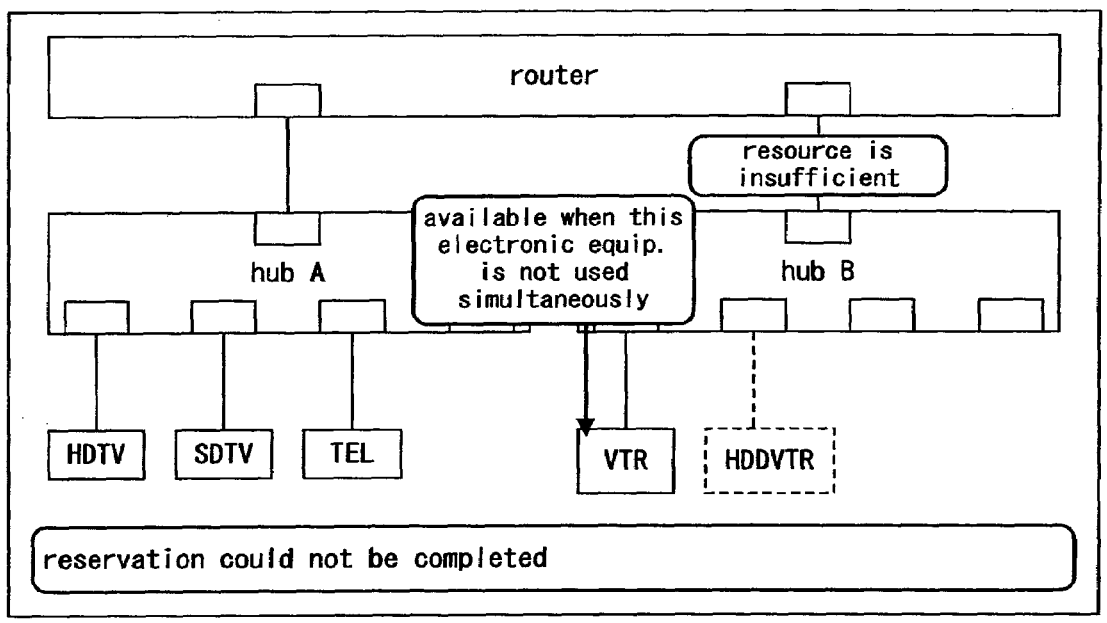
Fig. 22
| electronic equip. name | port | reserved bandwidth |
|---|---|---|
| second hub | port2 | 10M |

Fig. 38(a) | Please connect to port2 of HUB2

Fig. 38(b) | Please connect to lighting port of HUB2

Fig. 38(c) | Please connect to blinking port of HUB2

Fig. 38(d) | Please connect to port of living

Fig. 38(e) | Cannot be connected to anywhere

RESOURCE MANAGEMENT SYSTEM

BACKGROUND OF THE INVENTION

1. Field of the Invention

The present invention relates to a resource management system that reserves and manages resources such as a communication bandwidth and communication quality of a network that is comprised of a plurality of mutually connected network electronic equipments. In this specification, a network resource is simply referred as "resource." The present invention especially relates to techniques of reserving and managing resources in a home network where network-connectable home-electronics-appliances, such as AV electronic equipments, telephones, FAX machines etc., are connected.

2. Description of the Related Art

In a network environment represented by the Internet, a communication is done by dividing information into units called packets and by transmitting them. The packet transmission is processed by a best effort unless otherwise specified.

However, in multimedia data such as image and voice, communication quality should be guaranteed by securing the resource on a network path to communicate without disorder.

As a network resource reserving method, IETF (Internet Engineering Task Force) provides for resource reservation protocols such as RSVP (Resource Reservation Protocol), as an Internet standard.

In RSVP, a resource necessary for a multi-media communication is secured on a path to a communications partner before starting the multi-media communication. Use of RSVP can guarantee the communication quality, since a necessary resource is secured for every stream before starting the communication.

IETF also provides for DiffServ (Differentiated Services), IntServ (Integrated Services), etc., as a method to realize a bandwidth reservation based on a resource reservation.

(1) The resource reservation by RSVP reserves a resource when a service is started and there is no guarantee that a necessary resource is surely secured when the service is received. Therefore, as a result, the satisfactory service may not be receivable. Such situation may be acceptable in general communication service.

However, users of AV electronic equipments such as a TV and a VTR installed in a home network and a FAX machine, etc. would not find the service quality noted above acceptable. That is, it is a socially accepted idea to use these electronic equipments stably and it is not acceptable that these electronic equipments cannot be used depending on the time.

Therefore, in the network that connects these electronic equipments, it is not satisfactory to say that the resource reservation by RSVP is not enough.

(2) Since an advanced technical knowledge is required to comprise the network so as to secure the resource, it is difficult for a general user to install and set up the network. Since the users without a technical knowledge are expected to use the home network, a technique for easy installation and setup is required.

SUMMARY OF THE INVENTION

In view of the above, an object of the present invention is to provide a resource management system with easy installation and setup and that can provide reliable service.

A first aspect of the present invention provides a resource management system, comprising:

a plurality of electronic equipments classified into groups according to their capability;

a plurality of lower layer transmission devices with ports where the plurality of electronic equipments are connected;

a upper transmission device operable to connect the plurality of lower layer transmission devices in subordinates and to relay information among the plurality of electronic equipments being connected to the plurality of lower layer transmission devices; and a resource management server operable to manage resources to be used for transmitting information between the upper transmission device and the plurality of lower layer transmission devices.

The resource management server is operable to manage information of resource reservation status and information of groups of all said electronic equipments connected to the plurality of lower layer transmission devices.

And, when the plurality of electronic equipments are newly connected to the plurality of lower layer transmission devices, the plurality of electronic equipments is operable to send, to the resource management server, a notice of resource reservation request and group information thereof.

When the resource management server receives the notice, the resource management server is operable to set up a path connecting the newly connected electronic equipments and other electronic equipments belonging to the same group that the notice indicates, and the resource management server is operable to judge if the resource reservation request according to the notice is acceptable on the path set up in the network.

In this configuration, dividing the electronic equipments into groups in accordance with the capacity can make rational resource reservation, eliminating unnecessary connecting a combination like a telephone and a VTR.

A user can make the resource reservation by only connecting electronic equipments before receiving service and can receive high quality service easily.

A second aspect of the present invention provides a resource management system, wherein the resource management server is operable to update reservation status of the resources when the resource reservation request according to the notice is acceptable on the path set up in the network, and operable to make a resource reservation for the electronic equipment.

With this structure the reservation status is updated in accordance with the resource demand.

A third aspect of the present invention provides a resource management system, wherein the resource management server is operable to generate picture information displaying whether the resource reservation request is acceptable or not.

With this structure, showing the picture information enables a user to know easily whether the resource demand can be accepted.

A fourth aspect of the present invention provides a resource management system, wherein, when a resource reservation request by the electronic equipments is rejected, the resource management server is operable to generate picture information displaying a location on the network that causes the rejection.

With this structure, showing the picture information enables the user to know easily the location of the cause and to take countermeasures.

A fifth aspect of the present invention provides a resource management system, wherein, when a resource reservation request by the electronic equipments is rejected, the resource management server is operable to search an alternative port through which the resource reservation request is acceptable and to generate picture information displaying a location of the searched alternative port.

With this structure, showing the picture information enables the user to know the alternative port and to receive service by connecting the electronic equipment to this alternative port.

A sixth aspect of the present invention provides a resource management system, wherein when a resource reservation request by the electronic equipments is rejected and when there exist a plurality of grades of service quality, the resource management server is operable to make another resource reservation request with a lower grade of service quality.

With this structure, succeeding in a re-reservation enables the user to receive stable service by lowering service quality without reconnecting the electronic equipment.

A seventh aspect of the present invention provides a resource management system, wherein when a resource reservation request by the electronic equipments is rejected, the resource management server is operable to cancel the present reservation status and to make a new resource reservation request.

With this structure, the resource demand can be easily made by making the reservation again.

An eighth aspect of the present invention provides a resource management system, wherein the new resource reservation request is made in order of demand for higher grade resources.

With this structure, an electronic equipment that has high resource demand and is hard to be assigned is given priority.

A ninth aspect of the present invention provides a resource management system, wherein the new resource reservation request is made in order of demand for lower grade resources.

With this structure, an electronic equipment that has low resource demand and does not greatly decrease the resource by the assignment is given priority.

A tenth aspect of the present invention provides a resource management system, wherein the new resource reservation request is made as directed by a user input.

With this structure, the user's will is respected.

An eleventh aspect of the present invention provides a resource management system, wherein, when a resource reservation request is not actually practiced although reservation thereof is made, the resource reservation request is diverted to other services.

With this structure, unnecessary reservation can be eliminated.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is an exemplified illustration showing an electronic equipment performance table in the embodiment of the present invention.

FIG. 4 is a flowchart showing connection process for electronic equipments in the embodiment of the present invention.

FIG. 5 (a)-FIG. 5 (c) are exemplified illustrations showing a reservation status table in the embodiment of the present invention.

FIG. 6 is an exemplified illustration showing an insufficient location table in the embodiment of the present invention.

FIG. 7 is an exemplified illustration showing an available location table in the embodiment of the present invention.

FIG. 11 (a)-FIG. 11 (c) are exemplified illustrations showing a reservation status table in the embodiment of the present invention.

FIG. 16-FIG. 21 are exemplified illustrations showing picture information displays in the embodiment of the present invention.

FIG. 22 is a data structure illustrating a banned device table in the embodiment of the present invention.

FIG. 38 (a)-FIG. 38 (e) are exemplified display illustrations for the electronic equipment in the embodiment of the present invention.

DETAILED DESCRIPTION OF THE INVENTION

Preferred embodiment of the present invention is now described in conjunction with the accompanying drawings.

Figure 1:
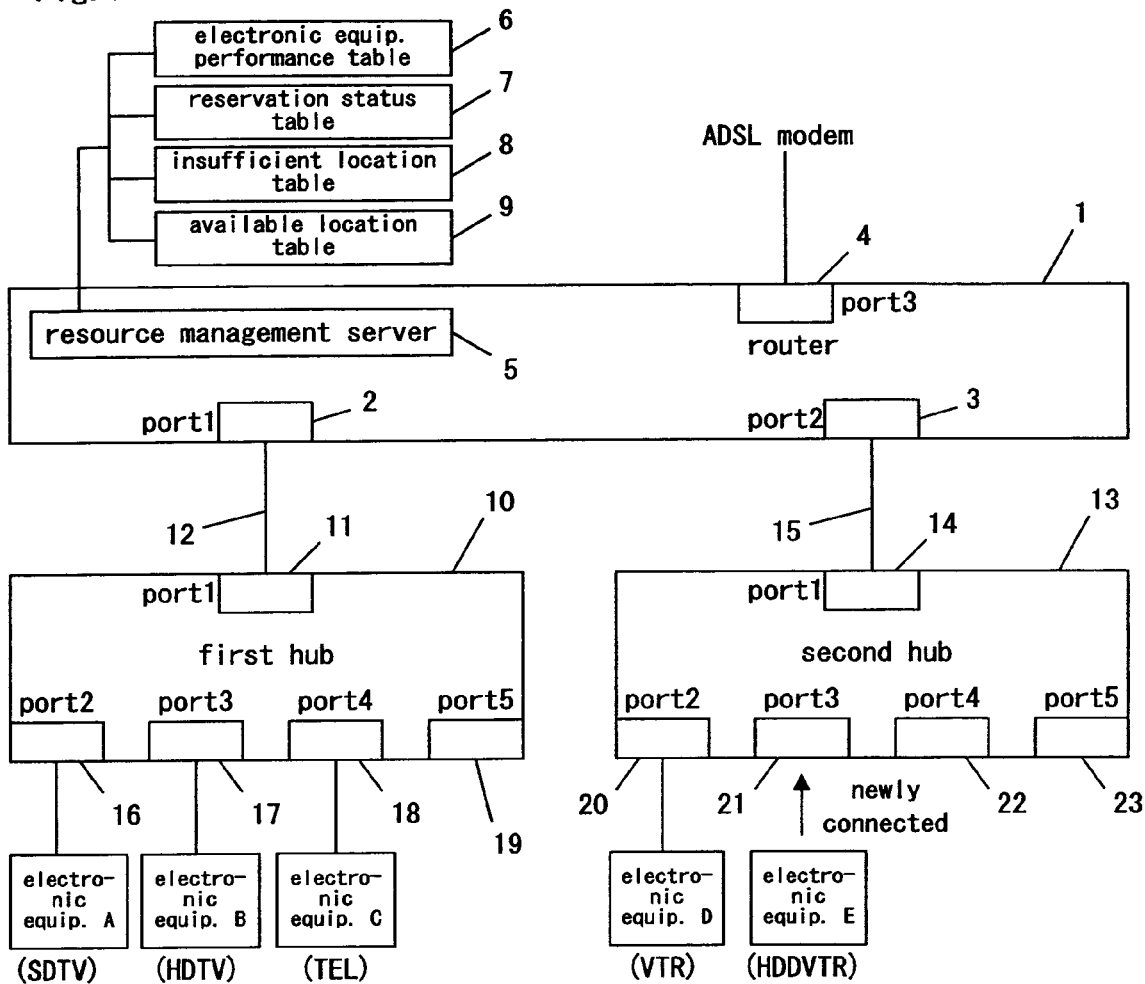
FIG. 1 is a block diagram illustrating a resource management system according to an embodiment of the present invention.

FIG. 1 is a block diagram illustrating a resource management system according to an embodiment of the present invention.

In FIG. 1, three ports that are, a first port 2, a second port 3 and a third port 4 are provided in a router 1 as an upper transmission device.

The third port 4 is connected to an ADSL modem. The first port 2 is connected to a first port 11 of a first hub 10 as a first lower layer transmission device through a transmission path 12. The second port 3 is connected to a first port 14 of a second hub 13 as a second lower layer transmission device through a transmission path 15.

The first hub 10 has a second port 16 through a fifth port 19 besides the first port 11. An electronic equipment A is connected to the second port 16, an electronic equipment B is connected to the third port 17, and an electronic equipment C is connected to the fourth port 18, and the fifth port 19 is vacant.

The second hub 13 has a second port 20 through a fifth port 23 besides the first port 14. An electronic equipment D is connected to the second port 20. The third port 21 through the fifth port 23 are vacant. An electronic equipment E is an additional equipment newly to be connected to the third port 21.

It is assumed, unless otherwise cited, that each port is connected by Ethernet (registered trademark) (100 base-TX) with a transmission capacity of 100 Mbps in both directions.

Here, a "lower layer transmission device" described in this specification may meditate a communication by an "upper transmission device" (a router 1 in the present embodiment). The "lower layer transmission device" may include hubs locating at a further lower layer, for example a hub that is cascaded to the fifth port 19 of the first hub 10.

For example, the first port 2 of the router 1 and the first port 11 of the first hub 10 are not necessarily connected directly by a transmission path 12, a repeating device (for example, another hub etc.) can be installed in this transmission path 12. Expressions such as the upper layer or the lower layer are relative. It is enough if the upper transmission device is located in the higher layer than the lower layer transmission device, and it does not mean that the upper transmission device should be located in the highest layer.

In such a network, SNMP (Simple Network Management Protocol) etc. gives the network configuration information how electronic equipments are connected.

A resource management server 5 manages the information concerning the resource reservation status and the information of groups of all electronic equipments connected to hubs 10 and 13 in the present resource management system.

Specifically, the resource management server 5 has an electronic equipment performance table 6 shown in FIG. 3, a reservation status table 7 shown in FIG. 5, an insufficient location table 8 shown in FIG. 6 and an available location table 9 shown in FIG. 7, and manages the present resource management system using these tables 6-9.

In the example of FIG. 1, the resource management server 5 is provided in a body with the router 1. However, the resource management server 5 can be installed in any location separately from the router, as long as the resource management server 5 is communicable with the network.

Figure 2:
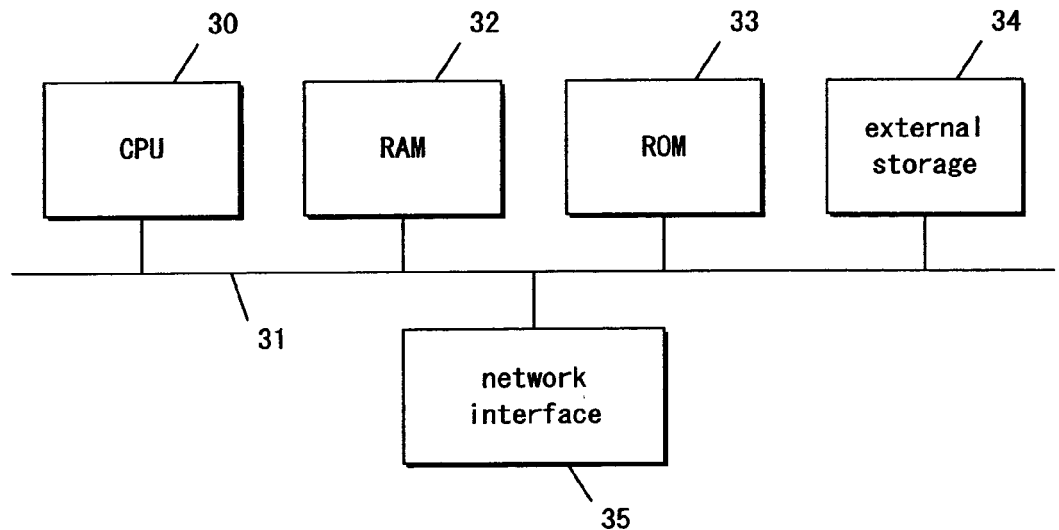
FIG. 2 is a block diagram illustrating a router in the embodiment of the present invention.

Next, the configuration example of the router 1 will be described using FIG. 2. FIG. 2 is a block diagram illustrating a router in the embodiment of the present invention.

As shown in FIG. 2, a router 1 has a CPU (central processing unit) 30, a RAM (random access memory) 32, a ROM (read only memory) 33, and an external storage device 34 (hard disk etc.) that are connected to the CPU 30 through a bus 31. The router 1 further has a network interface 35 that controls communication input/output.

Management programs pursuant to the flowcharts of FIG. 8 through FIG. 10, FIG. 13, and FIG. 15 are stored on a computer-readable medium or memory such as the ROM 33. That is, a computer-readable medium or memory may include the ROM 33, the RAM 32 or other external storage device 34. The CPU 30 manages the resource by executing the management programs. Tables 6 to 9 shown in FIG. 1 are secured as fixed areas in the RAM 32, the external storage 34, etc.

The router 1 as the upper transmission device is only one example. Other elements with other names such as a switch or a gateway may be used for the upper transmission device. These elements are also encompassed by the present invention. In the present embodiment, the resource management server 5 is built in the router 1. The configuration can not only comprise a network compactly, but the communication time between the router 1 and the resource management server 5 can be preferably shortened.

Next, the electronic equipment performance table 6 (especially groups of electronic equipments A-E and others) will be described referring to FIG. 3.

The electronic equipment performance table 6 in the present embodiment has fields such as electronic equipment name, group, function, network receiving capacity, receiving service capacity, network sending capacity, and service sending capacity.

The name of an electronic equipment is set to the field of the electronic equipment name. In the present example, the electronic equipment A is a standard television of NTSC (SDTV), the electronic equipment B is a Hi-Vision television (HDTV), the electronic equipment C is a telephone set (TEL), the electronic equipment D is a VTR (VTR), and the electronic equipment E is a Hi-Vision VTR (HDDVTR).

The values of AV, TEL, and others are set to the group field. The devices with the same value in the group field belong to the same group and the devices with the different value do not belong to the same group.

Values such as picture display, voice, recording picture and replaying picture are set to the function field.

Values of bit rate or "none" are set to the fields of the network receiving capacity and the network sending capacity. The number of channels or "none" is set to the fields of the receiving service capacity and the sending service capacity.

Connecting an electronic equipment to any vacant ports of the first hub 10 or the second hub 13 notifies the resource management server 5 as shown in FIG. 4.

That is, after the electronic equipment is connected to a vacant port at step 1, the electronic equipment detects the resource management server 5 located on the network through the connected port at step 2. At step 3, the electronic equipment notifies its performance to the resource management server 5. The resource management server 5, having received the notice, provides a new entry in the electronic equipment performance table and sets the notified value to this entry. Repeating the procedure makes the table as shown in FIG. 3.

When the electronic equipment E is not yet connected to the third port 21, as shown in FIG. 1, there is no entry for the electronic equipment E in FIG. 3. The entry of the electronic equipment E shown in FIG. 3 is to be added to the electronic equipment performance table 6 after the electronic equipment E is connected to the third port 21, and the resource management server 5 receives the notice of step 3.

The resource management server 5 makes a reservation referring to this electronic equipment performance table 6. In an example of FIG. 3, when notified the electronic equipment performance at step 3 in FIG. 4 from the electronic equipment D, the resource management server 5 considers the connection between the electronic equipments in accordance with their belonging group.

The electronic equipment D is a VTR, which has a capacity to distribute image on the network. Devices that have the capacity to receive the image from the electronic equipment D and display it are the electronic equipment A and the electronic equipment B belonging to the same AV group. Therefore, whether the resource between the electronic equipment D and the electronic equipment A, and between the electronic equipment D and the electronic equipment B can be reserved is considered.

In this consideration, the resource management server 5 takes into consideration that the maximum transfer capacity of the electronic equipment D is 10 Mbps and only the image of Ich can be distributed simultaneously referring to the electronic equipment performance table 6.

Next, the reservation status table 7 will be explained using FIG. 5. In the network of the present embodiment, three transmission devices such as the router 1, the first hub 10 and the second hub 13 are used as shown in FIG. 1.

Therefore, the reservation status table 7 in the present embodiment is comprised of three tables; the table of the router 1 (FIG. 5 (*a*)), the table of the first hub 10 (FIG. 5 (*b*)), and the table of the second hub 13 (FIG. 5 (*c*)).

Each table has fields such as connected party, available bandwidth (input), reserved bandwidth (input), available bandwidth (output) and reserved bandwidth (output) for every port.

Here, the term "available bandwidth" means a bandwidth available for reservation. "Input" means that data arrives to the corresponding port, and "output" means that data is sent from the corresponding port.

In the state of FIG. 5, the third port 21 of the second hub 13 has no connected party and both input and output are "0" in the reserved bandwidth, as shown in FIG. 5 (*c*).

Next, an insufficient location table 8 and an available location table 9 will be explained using FIGS. 6 and 7.

The insufficient location table 8 has three fields such as electronic equipment name, port and insufficient bandwidth. FIG. 6 shows the state that the first port 14 of the second hub 13 is short of the bandwidth by 5 Mbps.

This means that when the insufficient location table 8 is vacant (no entry), all the present resource demands can be accepted. However, when the insufficient location table 8 is not vacant, the resource demands cannot be accepted partly at the location shown by the entry.

The available location table 9 has two fields such as electronic equipment name and port as shown in FIG. 7. FIG. 7 shows that the first port 14 of the second hub 13 is available.

Next, the process in which the resource management server 5 searches the network path will be described using FIG. 8. First, when receiving a notice from an electronic equipment at step 3 in FIG. 4, the resource management server 5 specifies the location to be connected for the electronic equipment at step 10. This specification is executed as follows. The resource management server 5 acquires MIB (Management Information Base) information from the first hub 10 and the second hub 13 using SNMP as mentioned above, and compares the MAC address registered into each hub with the MAC address of the electronic equipment that has sent the notice. This comparison specifies the location to be connected for the electronic equipment.

Next, at step 11, the resource management server 5 registers the specified location to be connected into the reservation status table 7.

Next, at step 12, the resource management server 5 searches the electronic equipment performance table 5 and checks whether there is an entry belonging to the same group as the electronic equipment that have sent the notice.

If there is, the resource management server 5 specifies a path between the detected electronic equipment and the electronic equipment that has sent the notice at step 13 and records the path on the reservation status table 7 at step 14.

If there is not, at step 15, the resource management server 5 searches for other electronic equipments and repeats the process after step 12 until all search is completed.

Next, the process in which the resource management server 5 searches the resource will be described using FIG. 9. First, a path in the network recorded by the process in FIG. 8 is read at step 20 in FIG. 9. At step 21, the resource management server 5 obtains the present bandwidth information concerning the path.

At step 22, the bandwidth demanded by the electronic equipment that has sent the notice is compared with the present bandwidth, and checks whether the available bandwidth is equal to or more than the demanded bandwidth.

If so, at step 23, the resource management server 5 sets a flag that indicates the availability of this path, repeats the processes of step 21 through step 24 and proceeds to step 26. During the processes, searches advance from the port where the electronic equipment that has sent the notice, towards the target electronic equipment, until reaching to the target electronic equipment (step 24).

If not, at step 25, the resource management server 5 specifies the location that is short of the bandwidth, set this information to the insufficient location table 8 and proceeds to step 26.

Figure 12:
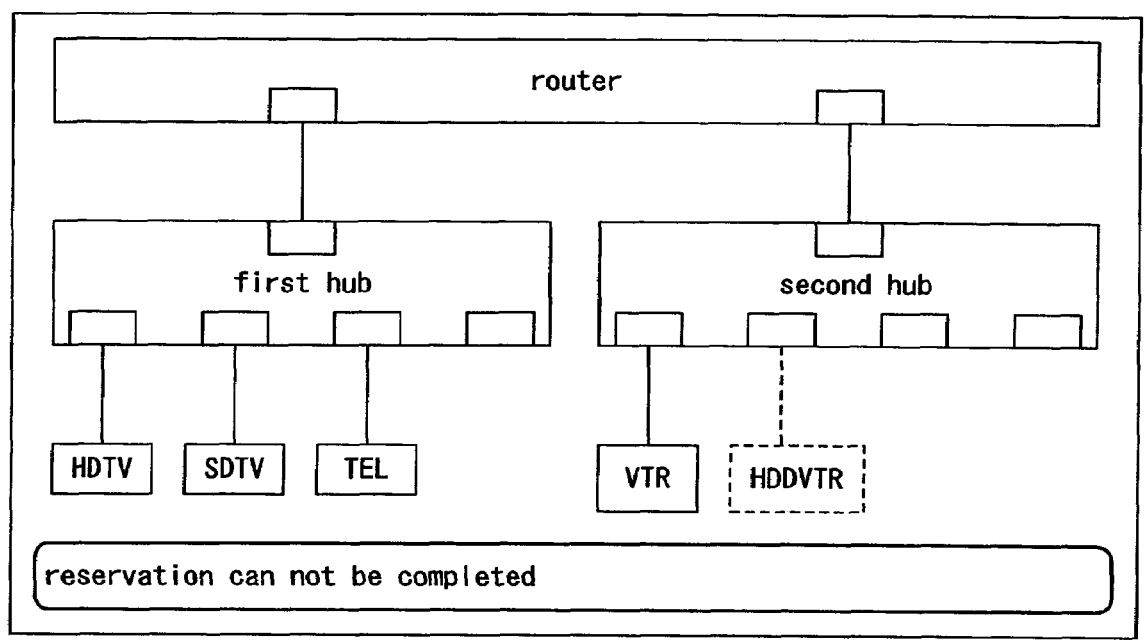
FIG. 12 is an exemplified illustration showing a picture information display in the embodiment of the present invention.

At step 26, the resource management server 5 confirms that all the paths have been checked and checks whether the insufficient location table 8 is not vacant. When vacant, the resource management server 5 ends the process. However, when not vacant, the resource management server 5 generates, at step 28, picture information that shows the reservation is impossible to accept as illustrated in FIG. 12.

This picture information is sent to electronic equipments on the network that are able to display the picture information (the electronic equipments A and B etc.) and displayed. The users may be notified by an LED display, voice, etc. if the electronic equipment does not have a display unit.

Next, the process that the resource management server 5 reserves a resource will be described using FIG. 10. First, at step 30 in FIG. 10, the recorded network path is read by the process described in FIG. 8.

At step 31, the resource management server 5 selects one of the electronic equipments that should be reserved and sends a reservation request to the selected electronic equipment (step 32). The resource management server 5 processes step 31 and step 32 for all the electronic equipments that should be reserved and repeats the processes of step 30 through step 33 for all paths (step 34).

The reservation request is notified to each network node (router 1, hub 10 and hub 13, etc.) in accordance with RSVP etc. Each node reserves its own resource for the service in accordance with the notice.

In the explanations above, the resource management server 5 issues the reservation request, but it is also possible to make electronic equipments to issue the reservation request. When such a reservation is executed, the reservation status table 7 before the electronic equipment E is connected will look like ones shown in FIG. 5.

The following describes how the resource management system according to the present embodiment works when, for example, the electronic equipment E is connected to the third port 21 of the second hub 13 as shown in FIG. 1.

First, when the electronic equipment E is connected to the third port 21, the electronic equipment E notifies its connection to the resource management server 5 according to the flowchart in FIG. 4.

Figure 8:
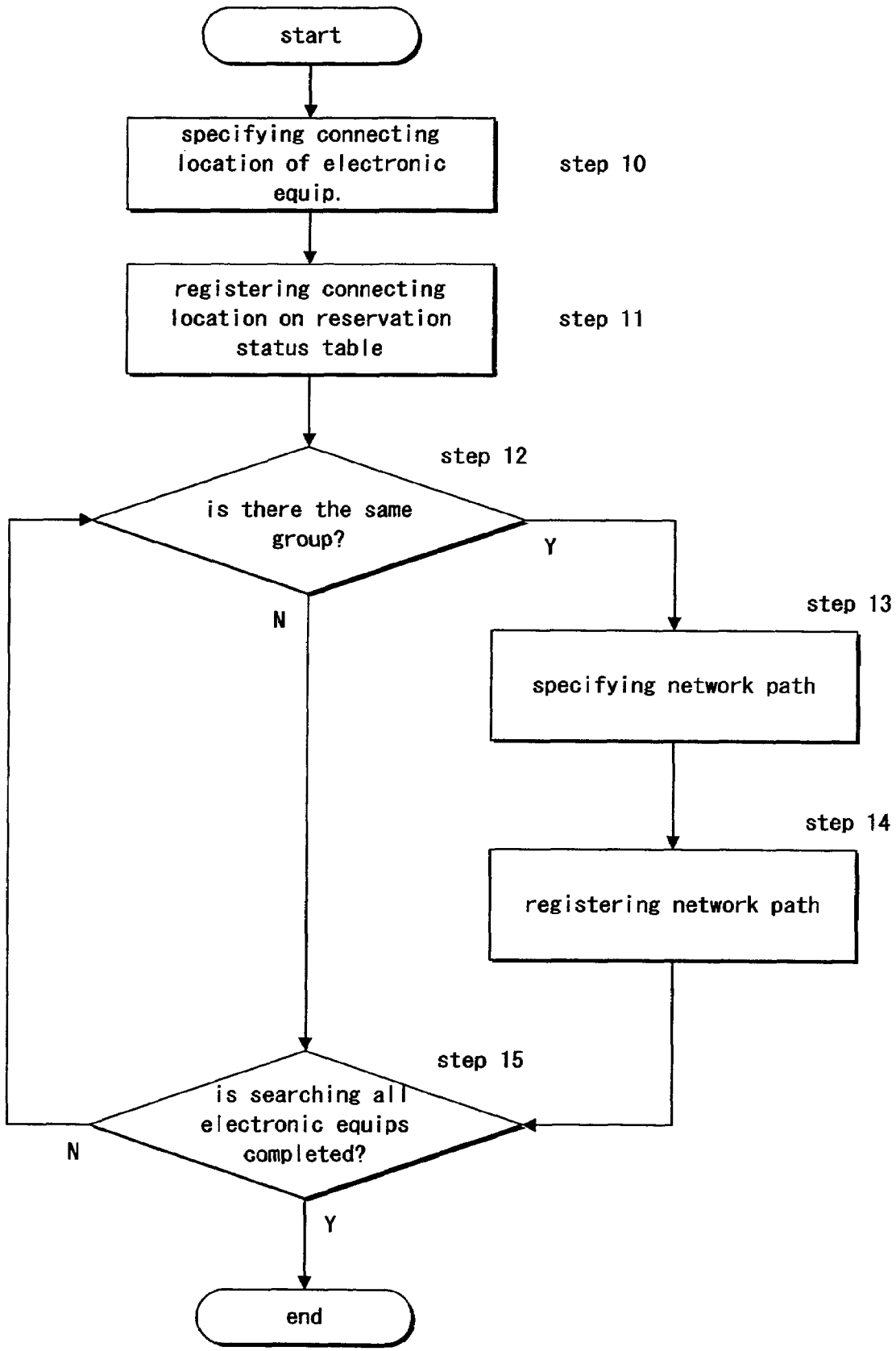
FIG. 8-FIG. 10 are flowcharts for a resource management server in the embodiment of the present invention.

When receiving this notice, the resource management server 5 searches a path on the network according to the flowchart of FIG. 8.

In the present example, since the electronic equipment E belongs to the AV group, the resource management server 5 searches electronic equipments belonging to the same AV group in the electronic equipment performance table 6, and hits the electronic equipments A, B, and D.

The resource management server 5 specifies the following three paths as the network path.

Figure 9:
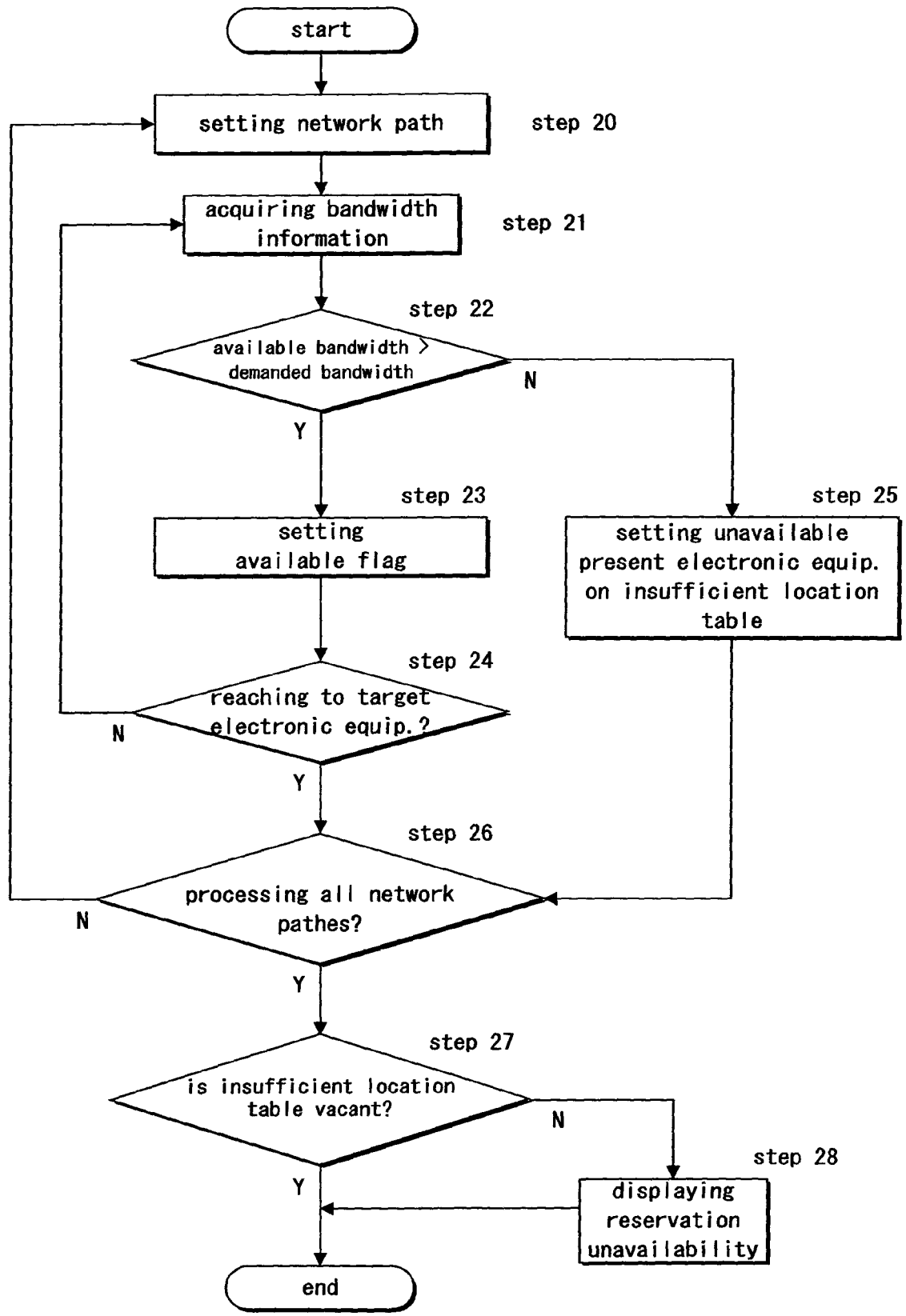

(Path 1) The third port 21 of the electronic equipment E-the first port 14 of the second hub 13-the second port 3 of the router 1-the first port 2 of the router 1-the first port 11 of the first hub 10-the second port 16 of the first hub 10-the electronic equipment A (Path 2) The third port 21 of the electronic equipment E-the first port 14 of the second hub 13-the second port 3 of the router 1-the first port 2 of the router 1-the first port 11 of the first hub 10-the third port 17 of the first hub 10-the electronic equipment B (Path 3) The third port 21 of the electronic equipment E-the second port 20 of the second hub 13-the electronic equipment D Next the resource management server 5 judges whether the resource demanded by the electronic equipment E is assignable to each path 1-3 according to FIG. 9.

That is, if the maximum of the resource demanded by the electronic equipment E is smaller than the remaining resource amount in all the locations of the path 1, it is assignable, and if not, it is judged as not assignable.

Each location of the path 1 is considered as follows. First, since the bandwidth 100 Mbps is not used at all in the location between the electronic equipment E and the third port 21 of the second hub 14, 22 Mbps is assignable.

In the location between the first port 14 of the second hub 13 and the second port 3 of the router 1, 10 Mbps bandwidths is already assigned out of the 100 Mbps leaving 90 Mbps available.

Therefore, 22 Mbps is assignable.

In the location between the first port 2 of the router 1 and the first port 11 of the first hub 10, 11 Mbps is already assigned out of the 100 Mbps bandwidths. 22 Mbps is assignable since 89 Mbps is available.

In the location between the second port 16 of the first hub 10 and the electronic equipment A, 10 Mbps of the 100 Mbps bandwidths is assigned. 22 Mbps is assignable since 90 Mbps is available. However, since a television (the electronic equipment A) can receive only 1 ch, the electronic equipment A can be received only from either the electronic equipment D or the electronic equipment E.

Considering the above, it is judged that the path 1 is assignable. The path 2 and the path 3 will be judged in the same way.

<Assignable Case>

Figure 10:
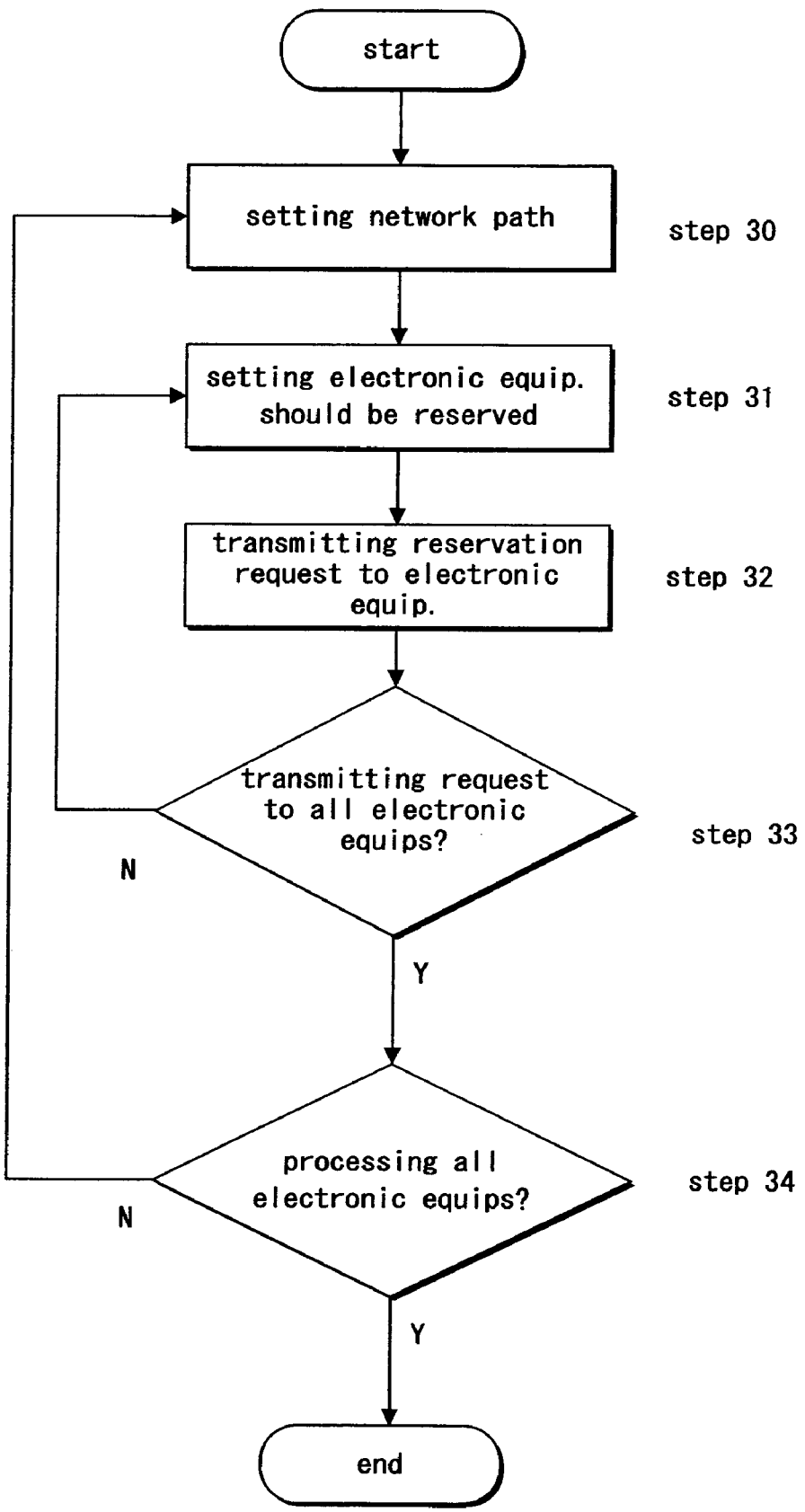

When assignable as a result of the judgment, the resource will be reserved in accordance with FIG. 10. When the electronic equipment E is connected and the path 1 is selected, the resource is reserved as mentioned above and the reservation status table 7 is changed from the status shown in FIG. 5 to the status shown in FIG. 11.

FIG. 11 shows that the connected party of the third port of FIG. 11 (c) has been changed from "none" to "the electronic equipment E" and the value of the path of the electronic equipment E has been changed.

<Not Assignable Case>

When the insufficient location table 8 is not vacant, the user is notified that the resource cannot be reserved using a GUI (graphic user interface) pursuant to the present embodiment.

The GUI as shown in FIG. 12 is preferred. However, the users may be notified by an LED display, voice, etc. if the electronic equipment does not have a display unit.

Figure 14:
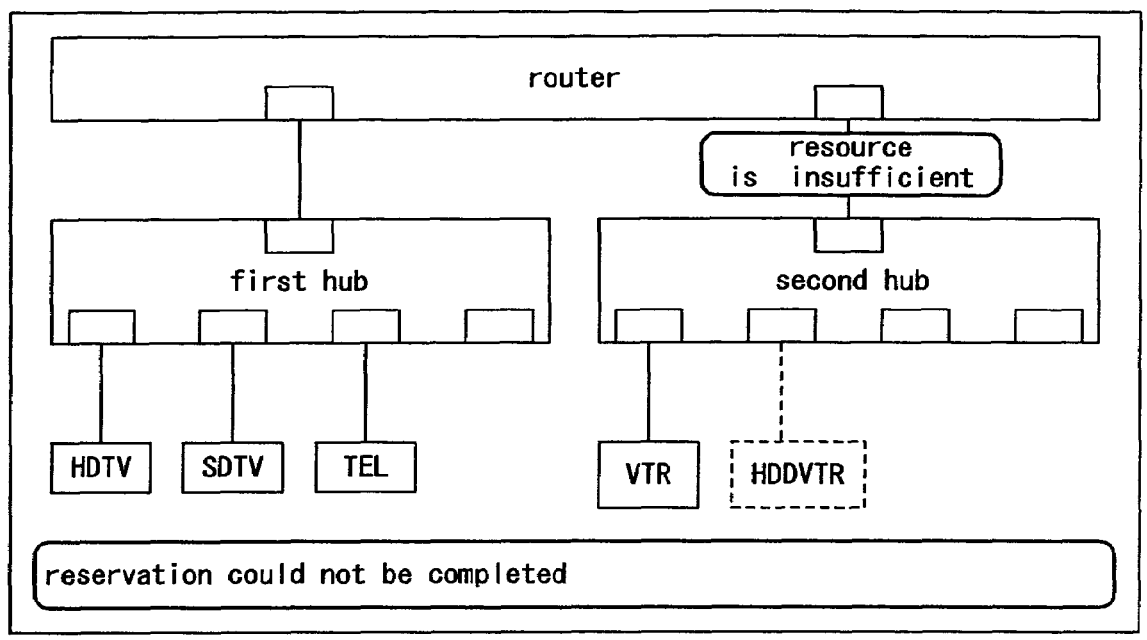
FIG. 14 is an exemplified illustration showing a picture information display in the embodiment of the present invention.

Pursuant to the present embodiment, the location that cannot assign the resource is displayed on the GUI as shown in FIG. 14.

Figure 13:
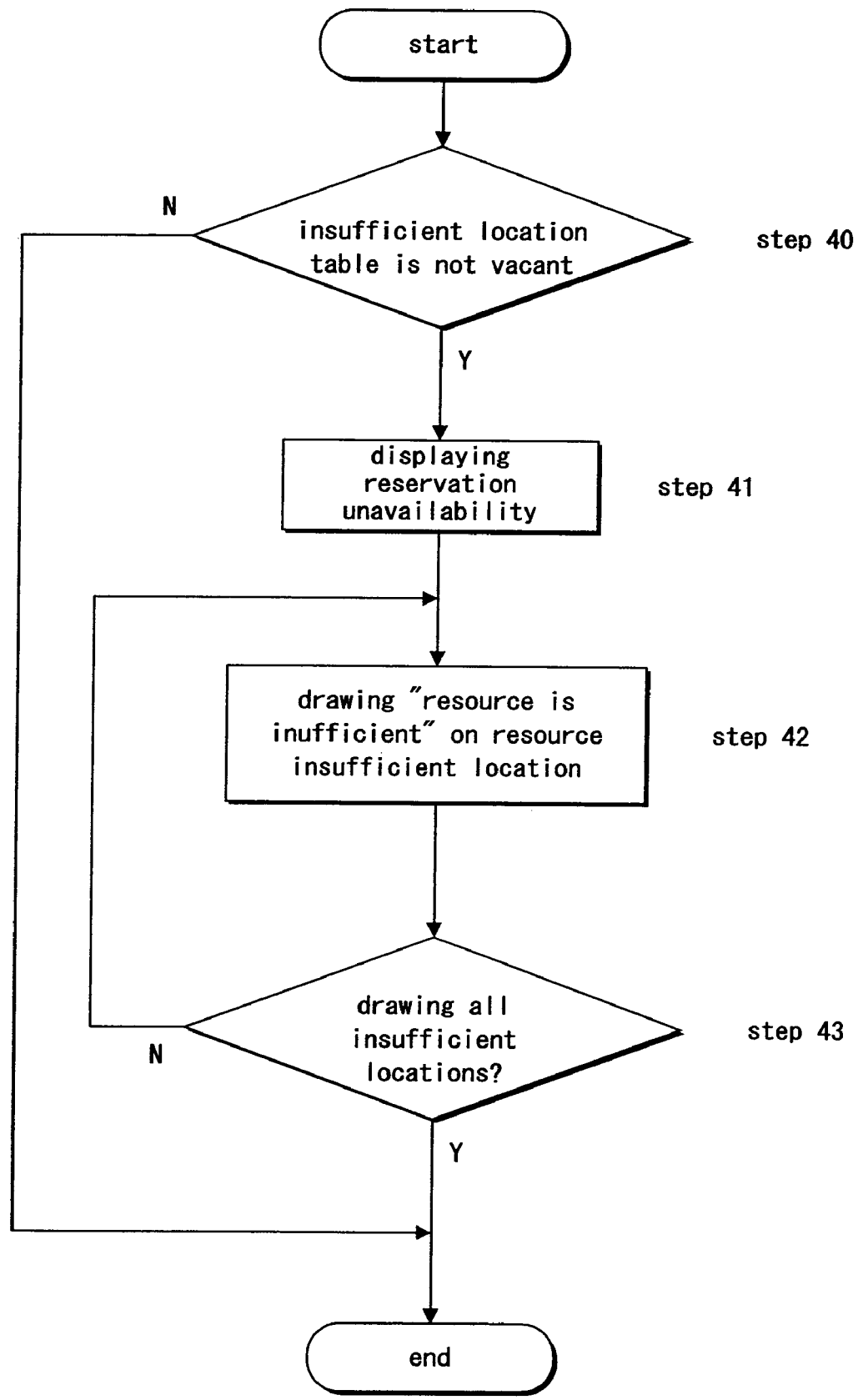
FIG. 13 is a flowchart for the resource management server in the embodiment of the present invention.

FIG. 13 is a flowchart for the resource management server in the present embodiment. The figure illustrates the process of the GUI display.

First, when the insufficient location table 8 is not vacant at step 40, the resource management server 5 draws, at step 41, the router 1 and the hubs 10 and 13 in a drawing area secured in the RAM32 as shown in FIG. 12, referring to the electronic equipment performance table 6 and the reservation status table 7. The resource management server 5 draws solid lines between the electronic equipments that are connected.

Next, at step 42, the message "the resource is in short" is drawn, as illustrated in FIG. 14, in the location where the resource is in short, based on the insufficient location table 8. Thereby, the user can confirm at which location the resource is in short. Therefore, the user can obtain the information necessary for the network rationalization such as extending the bandwidth in which the resource is in short frequently or providing another path.

Figure 16:
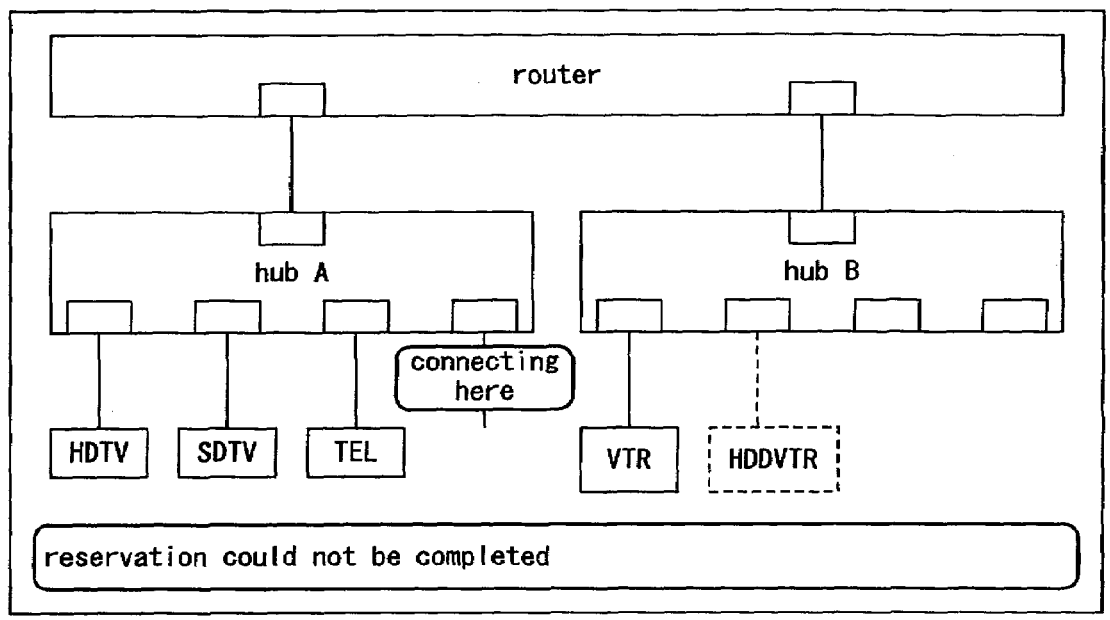

With the system of the present embodiment, the resource management server 5 has a function to search other locations to be connected that can provide the resource and to display the result on the GUI, and to reconnect to that location as shown in FIG. 16.

Figure 15:
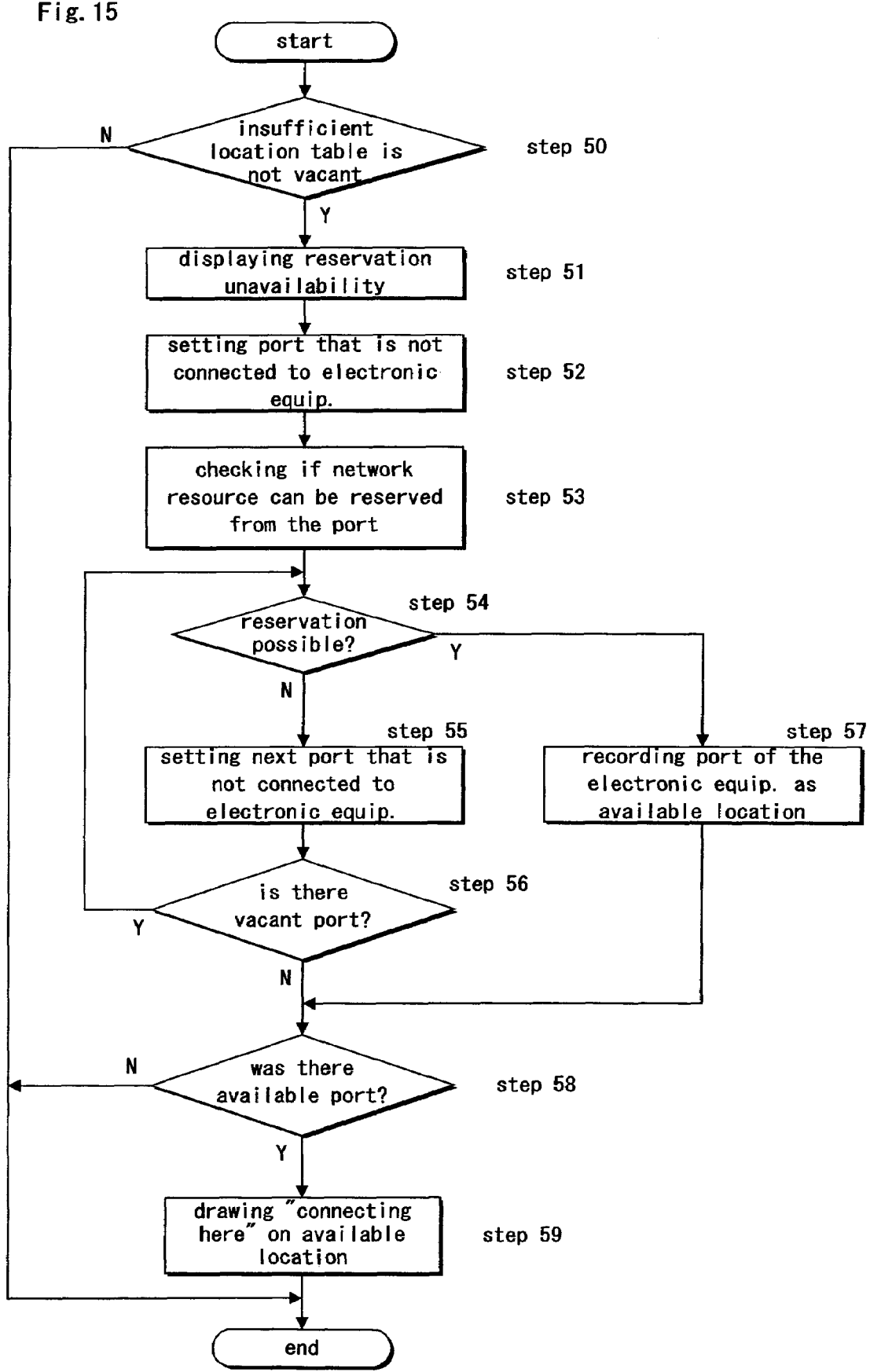
FIG. 15 is a flowchart for the resource management server in the embodiment of the present invention.

FIG. 15 is a flowchart for the resource management server according to the present embodiment. The figure illustrates the above-described reconnection process. Since the processes of steps 50 through 51 in FIG. 15 are the same as those of steps 40 and 41 in FIG. 13, the explanation will be omitted.

At step 52, the resource management server 5 selects one port where the electronic equipment is not yet connected among the ports of the router or the hub that are registered in the electronic equipment performance table 6. In this selection, priority may be given to either the router or the hub.

At step 53, the resource management server 5 checks whether the resource is assignable for the selected port, in the same way as shown in FIG. 8 and FIG. 9.

When there is an assignable port, at step 57, the resource management server 5 sets the port to the available location table 9 in FIG. 7. This process may be ended immediately after finding an assignable port (an alternative port) or continued until finding all assignable ports (alternative ports).

When the resource management server 5 finds the selected port not assignable, the resource management server 5 examines the next port (steps 55 and 56).

After ending the search of the port, when the available location table 9 is not vacant (step 58), the resource management server 5 draws picture as shown in FIG. 16 in the area mentioned above. That is, the message "connect here" is drawn on the connecting line drawn from the port of the electronic equipment (the alternative port) stored in the available location table 9.

In the above process, displaying the connecting location on the searched network by the GUI makes it feasible to show the user the connecting location where the service is available. If the user changes the connection according to the display, the user can receive the reliable service, which is convenient.

In order to cancel a reservation, search a path of the electronic equipment to be deleted and delete the resource of the electronic equipment to be deleted from the reservation status table 7 on the path in the same way as making a reservation.

<Re-Reservation>

When an assignment is impossible as a result of the judgment, re-reservation is possible by any one of method 1 through method 4, pursuant to the present embodiment.

(Method 1) In this method, when one electronic equipment can provide service by a plurality of resources, like an electronic equipment that can select the picture distribution of Hi-Vision quality and the picture distribution of standard VTR quality, the re-reservation is made by the lower quality resource when the assignment is impossible by the high quality resource.

For example, the electronic equipment E shown in FIG. 1 has the capacity to send a picture of Hi-Vision quality (22 Mbps) and a picture of standard VTR quality (6 Mbps). Thereby, the resource management server 5 tries the reservation first by the Hi-Vision quality that requires a high resource.

When this reservation is failed, the reservation is made again by the standard VTR quality for which the low resource is enough.

(Method 2) In this method, the resource management server 5 releases once the reservations of all electronic equipments and reserves again resource for from an electronic equipment with higher resource demand to an electronic equipment with lower resource demand, among the resources on the network (for example, since a VTR, a DVD player, etc. of Hi-Vision quality need many bandwidths, they are considered to demand the higher resource).

First, if the resource reservation is failed when connecting the electronic equipment E, the resource management server 5 cancels all the reservations once.

Next, the resource management server 5 restarts the reservation giving a priority to an electronic equipment with the highest resource demand (the electronic equipment with the greatest value of the network sending capacity in the electronic equipment status table 6 shown in FIG. 3). In the illustrated example, the order is the electronic equipment E, the electronic equipment D and the electronic equipment C.

When an electronic equipment becomes unusable due to resource shortage, the user of the electronic equipment may be preferably notified through the GUI.

(Method 3) In this method, the resource management server 5 releases once the reservations of all electronic equipments and reserves again resources for from an electronic equipment with lower resource demand to an electronic equipment with higher resource demand, among the resources on the network.

First, if the resource reservation is failed when connecting the electronic equipment E, the resource management server 5 cancels all the reservations once.

Next, the resource management server 5 restarts the reservation giving a priority to an electronic equipment with the lowest resource demand (the electronic equipment with the smallest value of the network sending capacity in the electronic equipment status table 6 shown in FIG. 3). In the illustrated example, the order is the electronic equipment C, the electronic equipment D and the electronic equipment E.

When an electronic equipment becomes unusable due to resource shortage, the user of the electronic equipment may be preferably notified through the GUI.

(Method 4) In this method, the priority is decided by the user through the GUI and the reservation is made again according to the priority.

First, if the resource reservation is failed when connecting the electronic equipment E, the resource management server 5 cancels all the reservations once.

Next, the resource management server 5 displays the GUI and asks the user to input the priority of the electronic equipment. When receiving the input from the user, the reservation is restarted according to the priority.

(Method 1) through (Method 4) may be executed independently or may be combined together if not mutually contradictory. When a resource reservation request is not actually practiced although the reservation itself is made, the resource reservation request may be diverted to other services, thus eliminating unnecessary reservation.

When the electronic equipment E is connected to the network, the above process makes it possible to reserve the resource so as to provide the reliable service among the electronic equipment E and the other electronic equipments. Therefore, when the electronic equipment E is used, the reliable service becomes surely available.

In the present embodiment, the bandwidth is used as the resource to reserve. Other parameters such as a delay may also be assigned.

In the present embodiment, the connection by Ethernet (registered trademark) has been explained. Other connections such as wireless LAN like IEEE802.11 may also be effective.

In the above explanations, three examples of the picture information display are shown in FIGS. 12, 14, and 16. These display examples and the process algorithm are extensible as described below.

Figure 17:
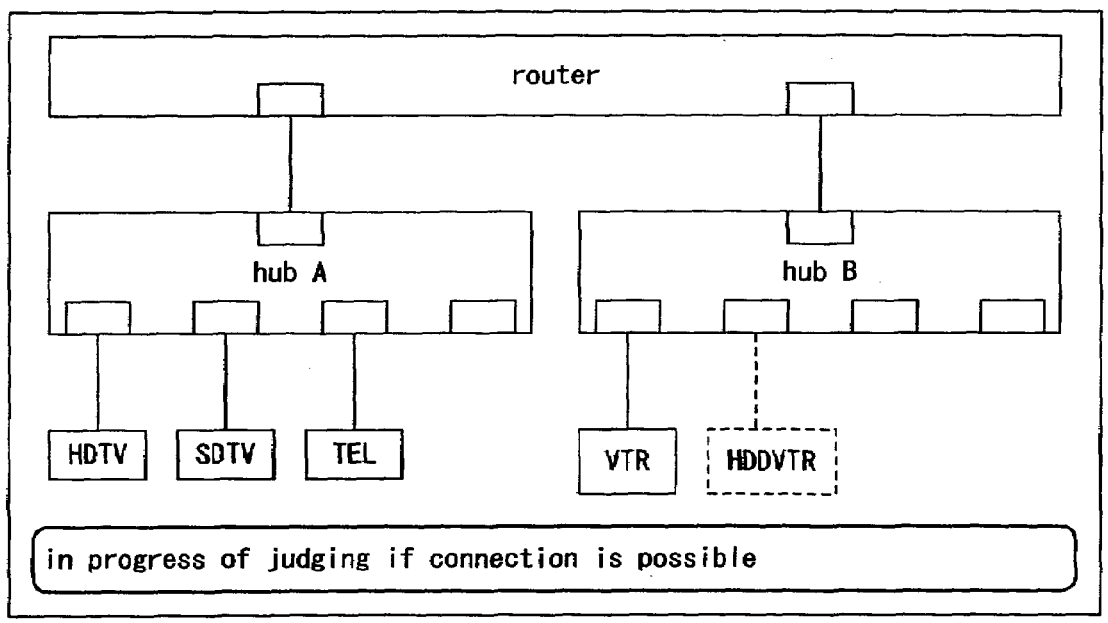

(1) It is desirable to be displayed that the connectability is being judged while the resource management server 5 is judging whether the connection of the demanded electronic equipment is possible as shown in FIG. 17. Or only the display like "Please wait for a while." is possible. This allows the user to know the present condition.

Figure 18:
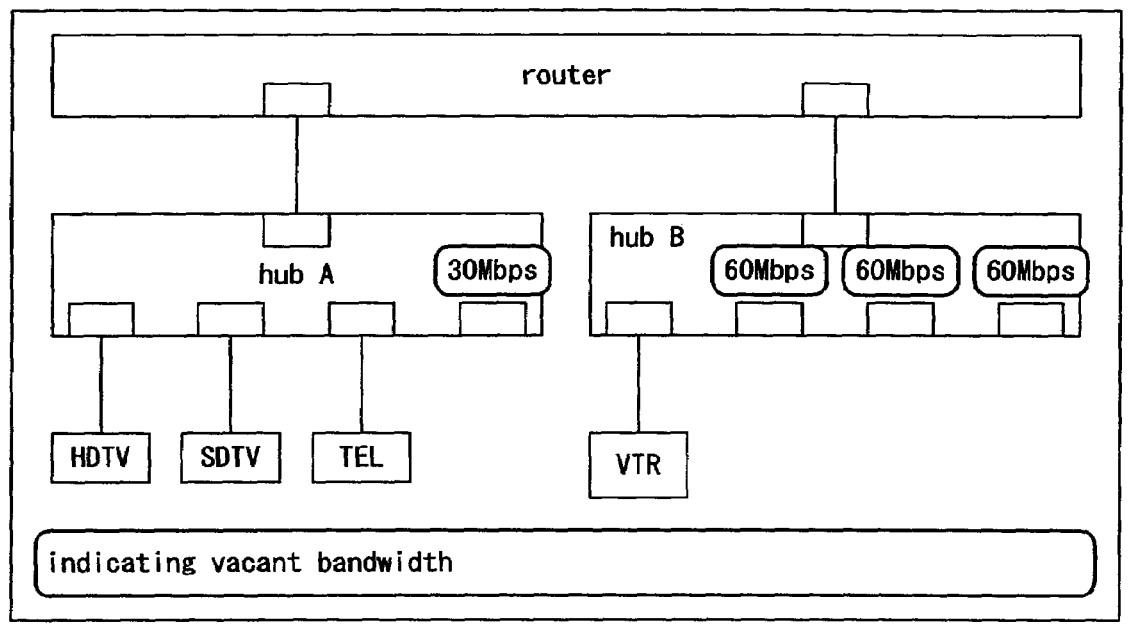

(2) It is also desirable to display the amount of the vacant bandwidth for each port before the user connects the electronic equipment to the port as shown in FIG. 18, which allows the user to know what kind of electronic equipments is connectable to the target port before connecting. Therefore, the user can refer to this information when purchasing a new electronic equipment, which is convenient.

The available bandwidths for all the vacant ports are simultaneously displayed in FIG. 18. The available bandwidth may also be displayed per every port.

Figure 19:
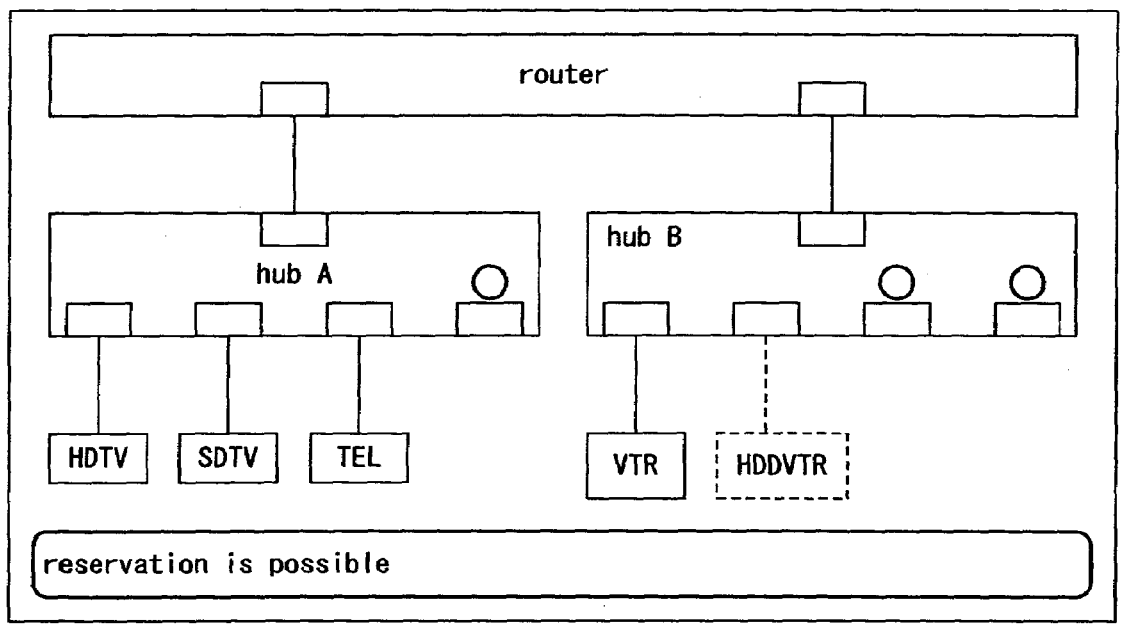

(3) A display as shown in FIG. 19 is also possible, if the resource management server 5 executes the process of FIG. 9 for all the vacant ports. That is, when the result of this process shows that the electronic equipment is connectable to a plurality of ports, all the connectable ports can be displayed.

This allows the user to select the installation place of the electronic equipment freely, which is convenient. All the connectable ports are displayed simultaneously in FIG. 19. The connectable ports may be displayed one by one.

In FIG. 19, it is enough to let the user notify that the corresponding port is connectable. Other displays like marking "O.K." etc. are acceptable. Or the display showing the unconnectable port, for example, by marking "X" etc. is also acceptable.

(4) In FIG. 12 and others, the display shows that the electronic equipment is unavailable because of the resource shortage at the time when connecting the electronic equipment in using the corresponding port. However, the display indicating that the electronic equipment is unavailable may be made at the time when the electronic equipment starts to use the resource practically, like replaying operation, etc. as shown in FIG. 20

This provides the user with the information on the reason why the electronic equipment is unusable and the place of the cause, which is convenient.

(5) The display may not only show the user that the reservation is impossible simply because of the resource shortage but also show that the user can use the electronic equipment if the other electronic equipments now being used is stopped to use.

The resource management server 5 may execute the following process for this purpose.

First, the resource management server 5 secures, in the RAM 32, the stop device table (table indicating devices to be stopped) with a data structure shown in FIG. 22.

Figure 23:
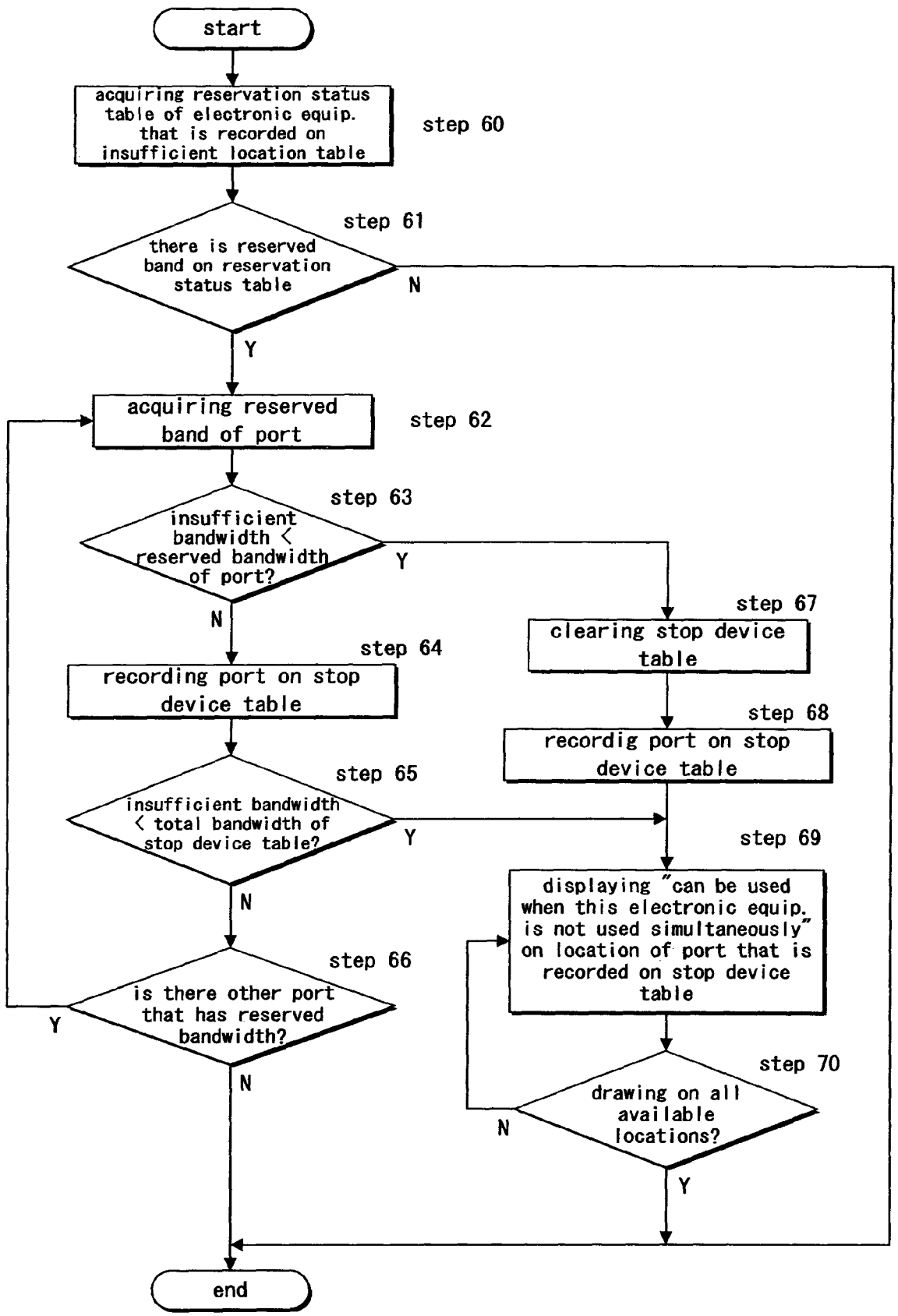
FIG. 23 is a flowchart for the resource management server in the embodiment of the present invention.

Next, the resource management server 5 searches the electronic equipment to be stopped by an algorithm illustrated in FIG. 23. First, at step 60, the information on the reservation status of the electronic equipment recorded in the insufficient location table 8 is obtained from the reservation status table 7.

At step 61, the resource management server 5 ends the process when there is no reserved bandwidth in the reservation status table 7, otherwise, the resource management server 5 proceeds to step 62.

At step 62, the resource management server 5 obtains the reserved bandwidth of the corresponding port and checks at step 63 whether the insufficient bandwidth is smaller than the reserved bandwidth of the corresponding port.

When not smaller at step 63, the resource management server 5 records the value of the insufficient bandwidth on the table stored in the RAM32 and at step 65 the resource management server 5 checks whether the insufficient bandwidth is smaller than the total bandwidths of the stop device table at step 64.

When not smaller at step 65, the resource management server 5 checks whether there are other ports with the reserved bandwidth at step 66. When there are not, the resource management server 5 ends the process and when there are, the resource management server 5 returns the process to step 62.

When smaller at step 63, the resource management server 5 clears the stop device table at step 67, and records the corresponding port on the stop device table at step 68 and proceeds to step 69.

When smaller at step 65, the resource management server 5 proceeds to step 69.

From step 69 to step 70, the resource management server 5 displays "Available unless using this electronic equipment" for all the ports recorded on the stop device table.

The display may not only show the user that the reservation is impossible simply because of the resource shortage, but also show that the user can use the electronic equipment if the other electronic equipments now being used is stopped to use.

This allows the user to use a new electronic equipment when some other electronic equipments are stopped to use, which is convenient.

In other way, the result of the process by the resource management server 5 described above may be also displayed as shown in FIG. 24. That is, from step 69 to step 70, the display showing "Remove this electronic equipment" instead of "Available unless using this electronic equipment at the same time" as shown in FIG. 21 is also possible.

This allows the user to use a new electronic equipment surely when removing some electronic equipments, which is convenient.

Figure 24:
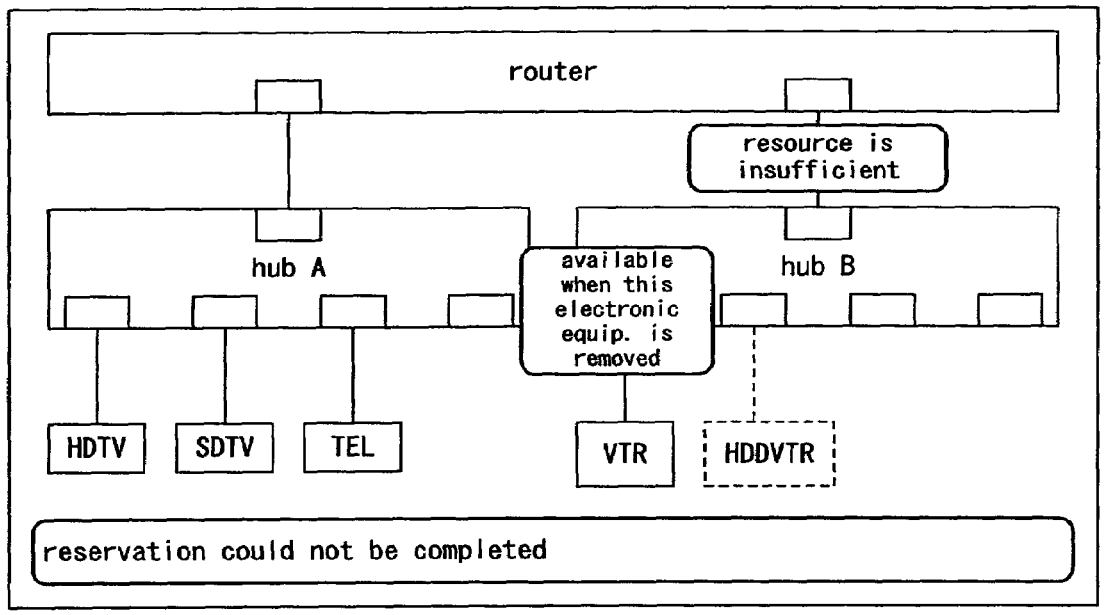
FIG. 24-FIG. 25 are exemplified illustrations showing picture information displays in the embodiment of the present invention.

Although FIG. 24 illustrates only one electronic equipment of which connection should be canceled, a plurality of electronic equipments of which connections should be canceled are displayable at once.

(6) The display may not only show the user that the reservation is impossible because of the resource shortage, but also show that the user can use the electronic equipment if the other electronic equipment now being used is moved from the presently using port to another port.

Figure 26:
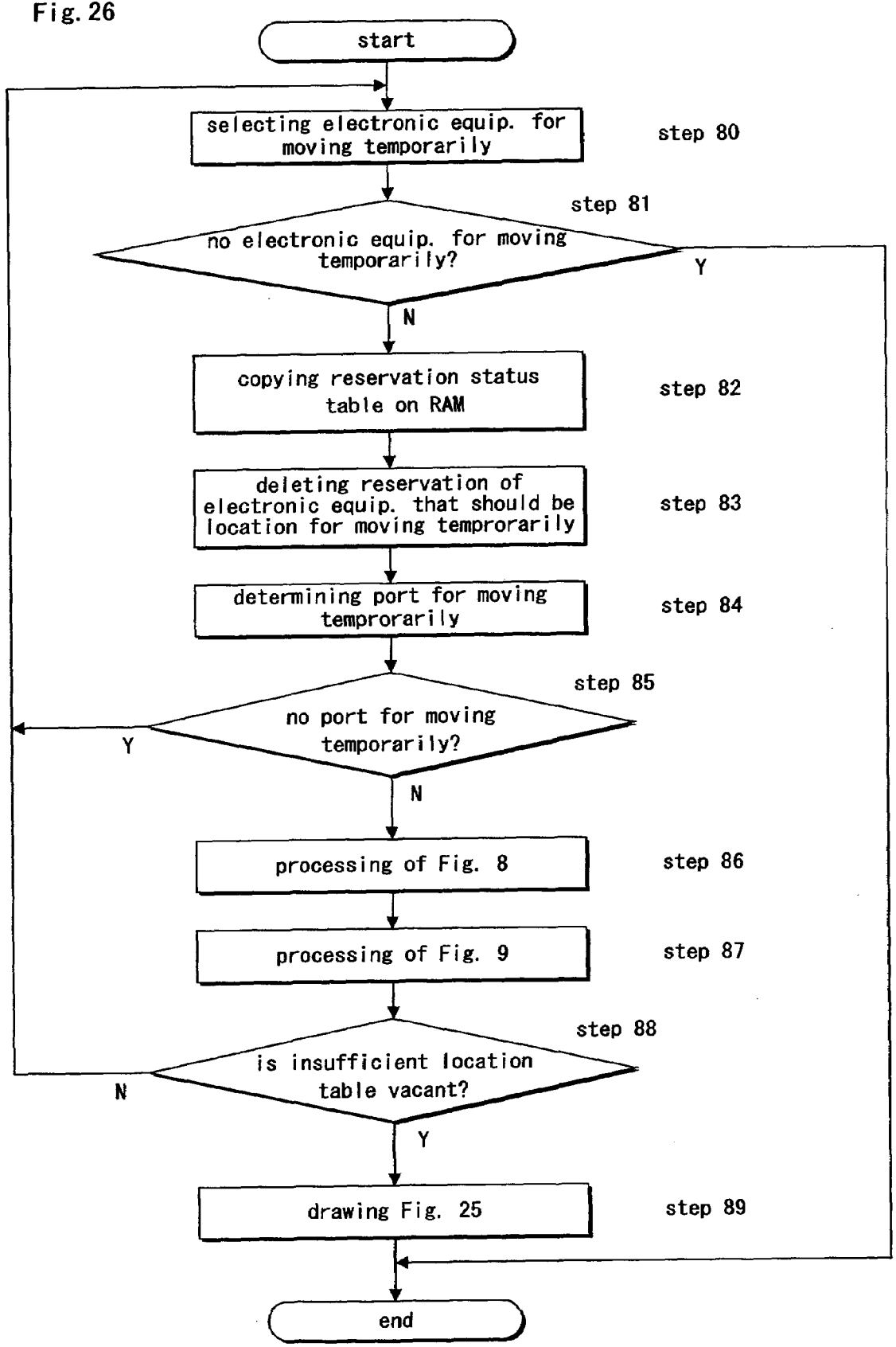
FIG. 26 is a flowchart for the resource management server in the embodiment of the present invention.

The resource management server 5 may execute the process illustrated in FIG. 26 for this purpose. At step 80, the resource management server 5 selects one electronic equipment that is moved temporarily, and the resource management server 5 ends the process when there is no electronic equipment that is moved temporarily or when all electronic equipments have been moved temporarily at step 81. Otherwise, the resource management server 5 moves the process to step 82.

At step 82, the resource management server 5 copies the reservation status table 7 into the RAM32 and deletes from the RAM32 the reservation of the electronic equipment that has been moved temporarily at step 83.

At step 84, the resource management server 5 selects one port to which the electronic equipment is moved temporarily among the vacant ports.

At step 85, when there is no vacant port or all the vacant ports have been completed to be examined, the resource management server 5 returns the process to step 80 and selects the next electronic equipment to be moved temporarily. Otherwise, the resource management server 5 moves the process to step 86.

At step 86, the resource management server 5 obtains the path in the same way as illustrated in FIG. 8. At step 87, the resource management server 5 sets the available flag in the same way as illustrated in FIG. 9.

Figure 25:
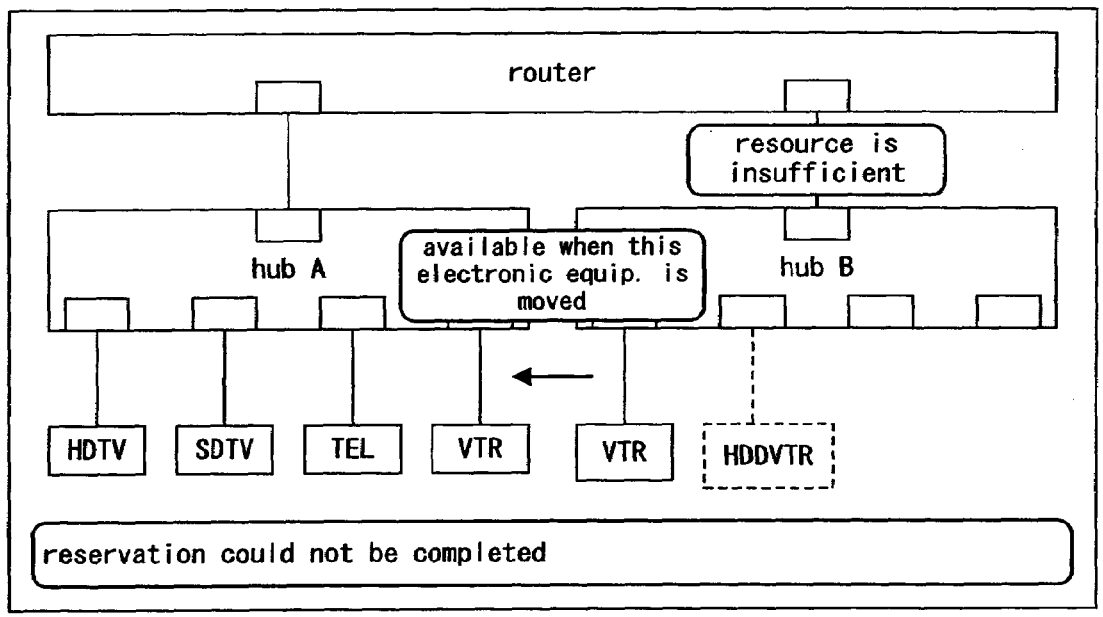

At step 88, when the insufficient location table 8 is vacant, the resource management server 5 draws picture as shown in FIG. 25 at step 89. Otherwise, the resource management server 5 returns the process to step 80.

Therefore, the display may not only show the user that the reservation is impossible because of the resource shortage, but also show that the user can use the electronic equipment if the other electronic equipment now being used is moved from the presently using port to another port.

This allows the user to connect the desirable electronic equipment to the desirable port and to use it for sure, only if the specified electronic equipment is moved as instructed, which is convenient.

Figure 27:
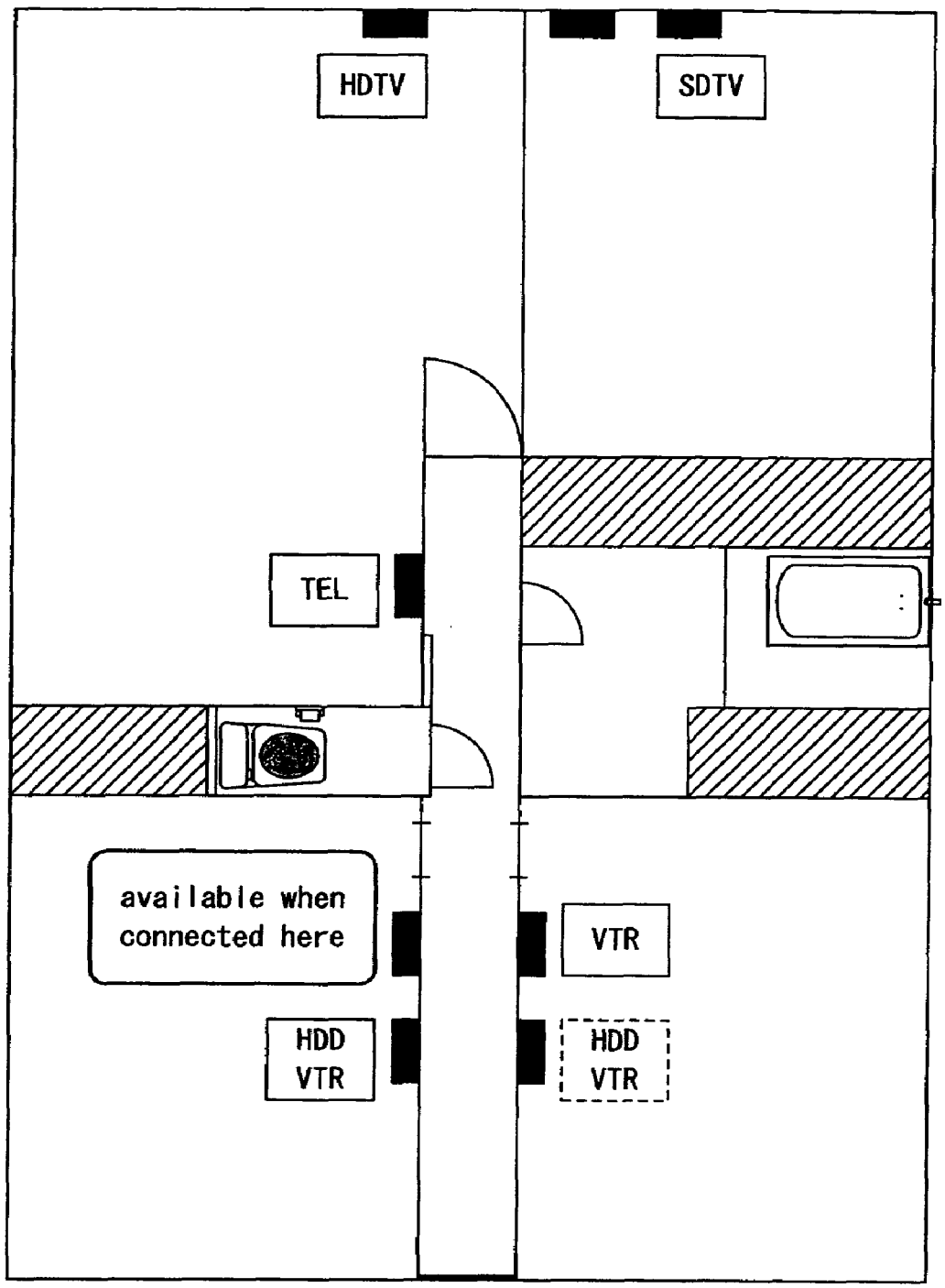
FIG. 27-FIG. 28 are exemplified illustrations showing picture information displays in the embodiment of the present invention.

(7) The network path is displayed with the tree structure in the explanation above. However, when room arrangement of a building (for example, a house, an office building, etc.) in which the electronic equipment is installed is already known, an electronic equipment, a port, etc. can be displayed according to the room arrangement as shown in FIG. 27.

This allows the user to understand the location of the available port easily and intuitively of the desirable electronic equipment, which is convenient.

Figure 28:
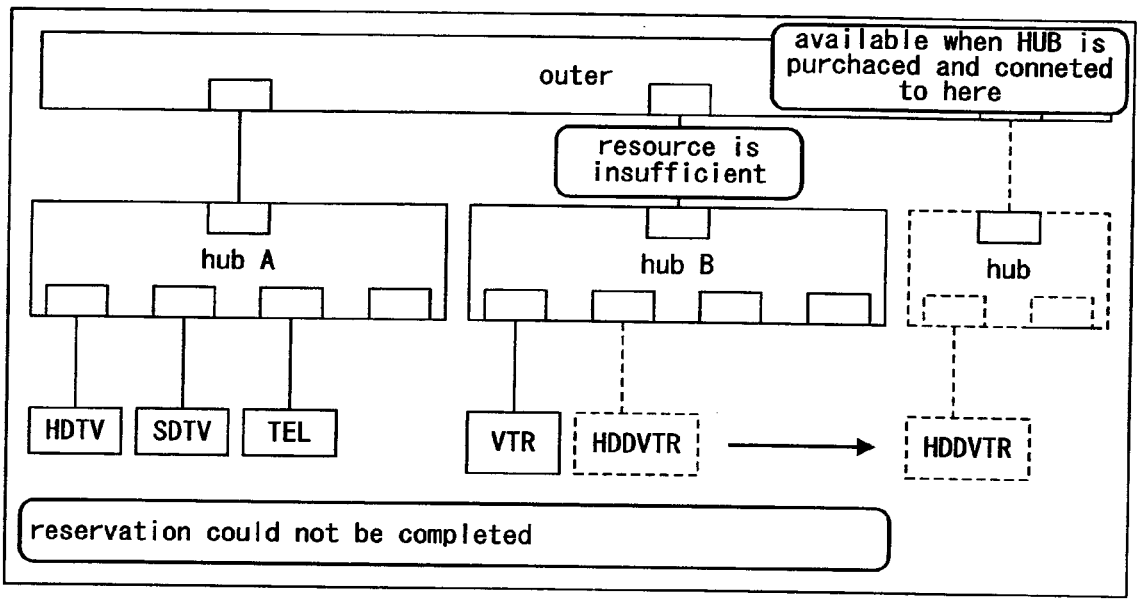

(8) A display showing that the electronic equipment is connectable if the user purchases a new hub or a new switch etc., may be possible as shown in FIG. 28. An algorithm for this purpose can be comprised when various algorithms mentioned above are combined in a proper way.

This allows the user to use the desirable electronic equipment surely if the user purchases a new hub etc. and connects the desirable electronic equipment as instructed, which is convenient.

(9) In the above explanation, the case when a user connects the electronic equipment by himself/herself has been described. However, a case when a user calls a serviceman asking to make the connection of the electronic equipment is also possible. In such a case, follow the subsequent procedures.

Figure 29:
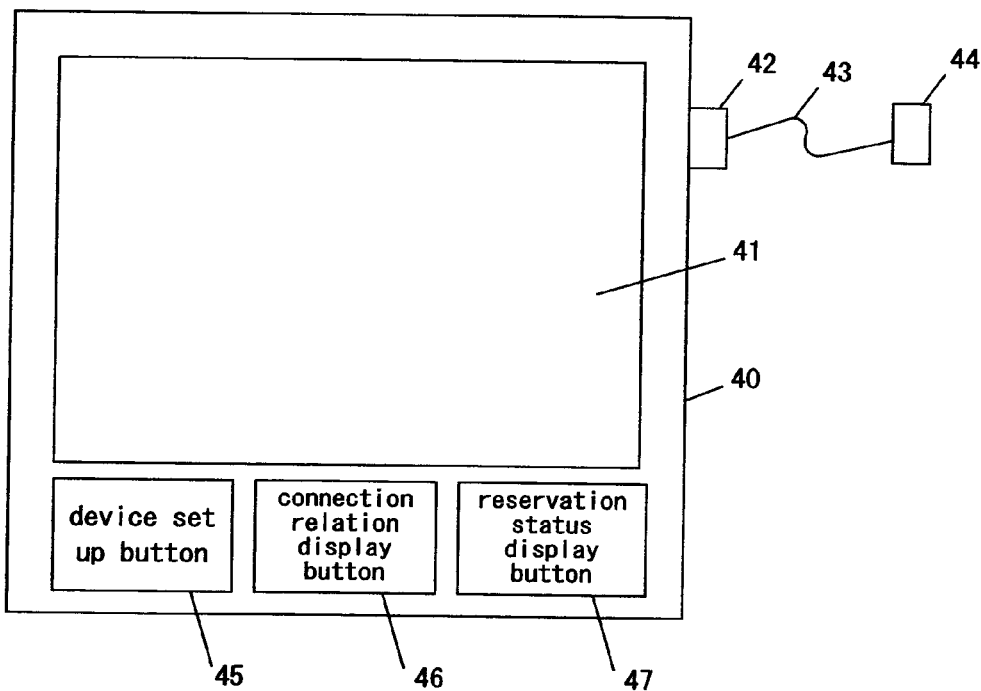
FIG. 29 is a front view of a mobile information device in the embodiment of the present invention.

FIG. 29 shows a mobile information device for servicemen (for example, PDA, a cellular phone, a portable personal computer, etc.). This mobile information device comprises a body 40 and the following elements installed in the body 40.

A display 41 is a touch panel, a tablet, or a display panel (LCD etc.) and displays the resource usage etc. A network cable 43 is connectable to a port 42 and a terminal 44 that is connectable to the port is installed at the tip of the network cable 43.

A device setup button 45, a connection relation display button 46, and a reservation status display button 47 are installed in the body 40. These buttons 45 through 47 are installable in the display 41 as software keys when the display 41 comprises a touch panel or a tablet, etc.

The device setup button 45 is to input resource demand, group information, etc. for electronic equipments to be used. The manual entry in accordance with the display 41 etc. is possible, and some or all information from the resource management server 5 through the network is also obtainable. Or, this information is obtainable by entering the model number of an electronic equipment on the web site of the company on the Internet.

Figure 30:
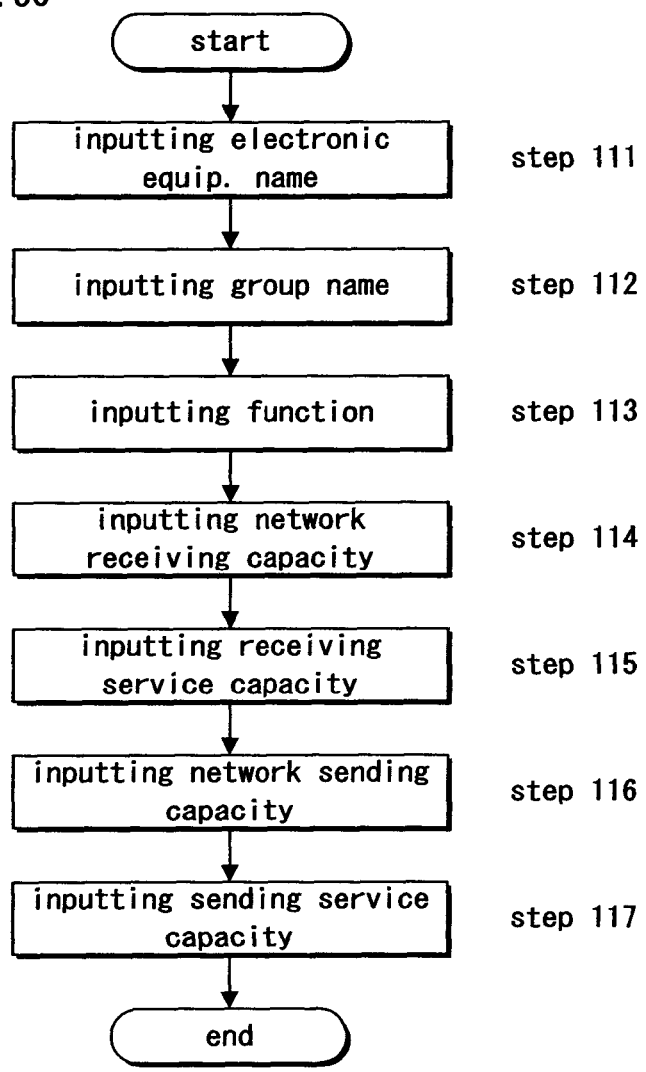
FIG. 30-FIG. 32 are flowcharts for the mobile information device in the embodiment of the present invention.

Depressing the device setup button 45 executes the process shown in FIG. 30. That is, device name, group name, function, network receiving capacity, receiving service capacity, network sending capacity and sending service capacity are entered in order at step 111 through step 117. The order of this entry is changeable at random. That is, to specify the device performance table 6 shown in FIG. 3 is enough.

This entry can be executed without an electronic equipment. This enables the user to check the installation place of an electronic equipment before the purchase of the electronic equipment, which is convenient.

In FIG. 29, the connection relation display button 46 is for obtaining connection-related information from the resource management server 5.

Figure 31:
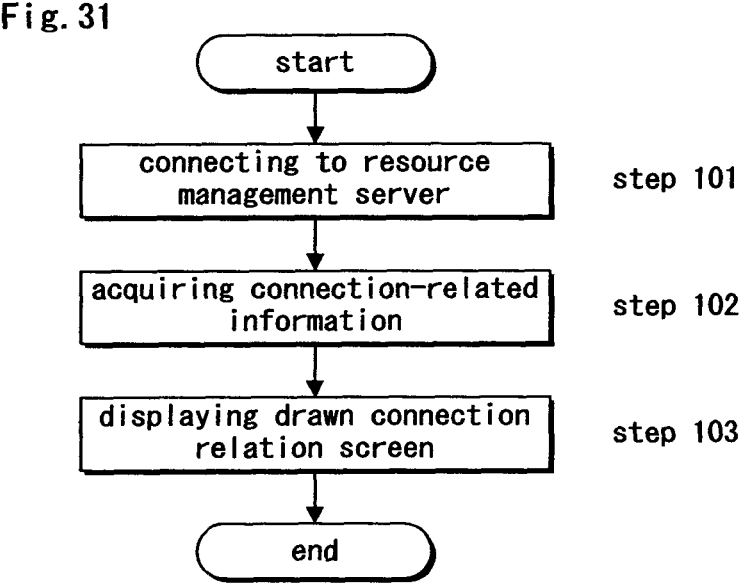

After inserting the terminal 44 in a suitable vacancy port, depressing the connection relation display button 46 executes the procedures shown in FIG. 31. At step 101, the mobile information device is connected to the resource management server 5 through a cable 43.

Then at step 102, the mobile information device obtains the connection-related information from the resource management server 5 and displays the obtained information on the display 41 at step 103.

In FIG. 29, the reservation status display button 47 is for obtaining the information on reservation status from the resource management server 5.

Figure 32:
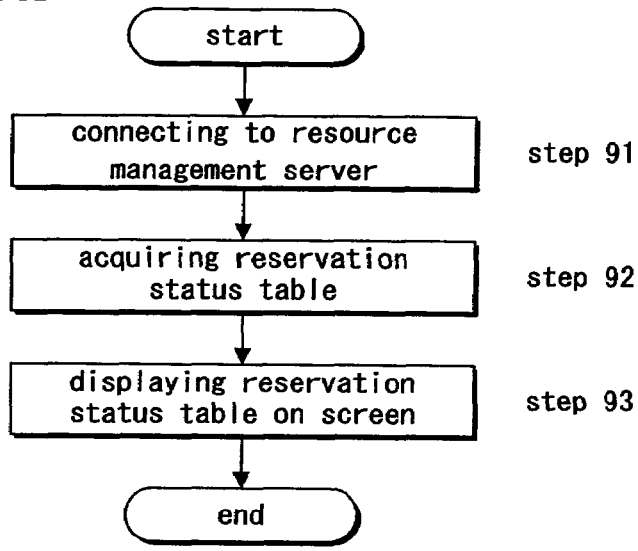

After inserting the terminal 44 in a suitable vacancy port, depressing the reservation status display button 47 executes the procedures shown in FIG. 32. At step 91, the mobile information device is connected to the resource management server 5 through the cable 43.

Then at step 92, the mobile information device obtains the information on the reservation status table 7 from the resource management server 5 and displays the obtained information on the display 41 at step 93. This makes feasible to check the reservation status and the connection relation with the mobile information device, which is convenient for maintenance.

Figure 33:
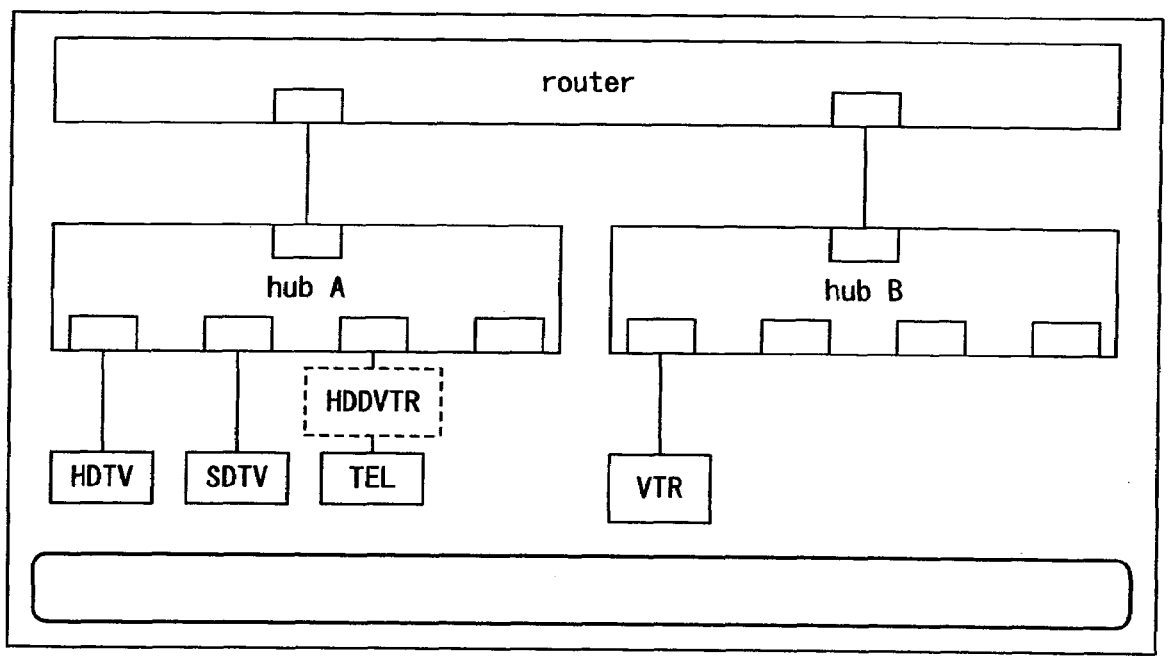
FIG. 33-FIG. 34 are exemplified illustrations showing picture information displays in the embodiment of the present invention.

(10) There is also a case when a new electronic equipment (a Hi-Vision VTR here) is desired to be connected to the port where already another electronic equipment (a telephone here) has been connected as shown in FIG. 33. One example is a case where other places are inconvenient because of the room arrangement.

Here, a port to be connected is easily designated with a remote-control device attached to an electronic equipment or the mobile information device shown in FIG. 29, and others.

Figure 34:
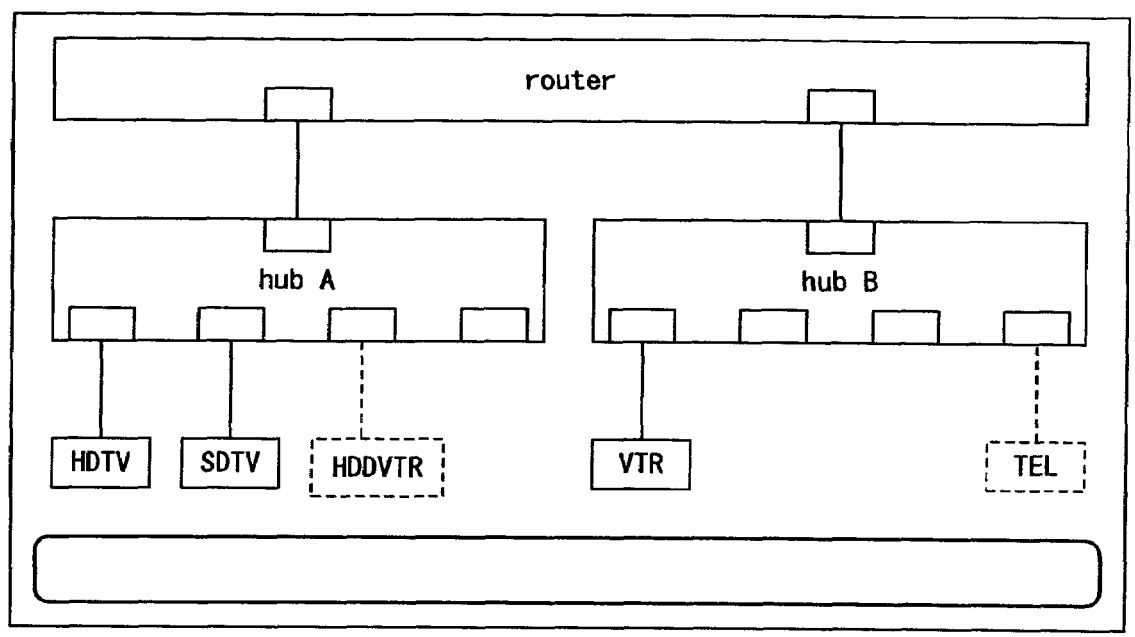
Figure 35A:
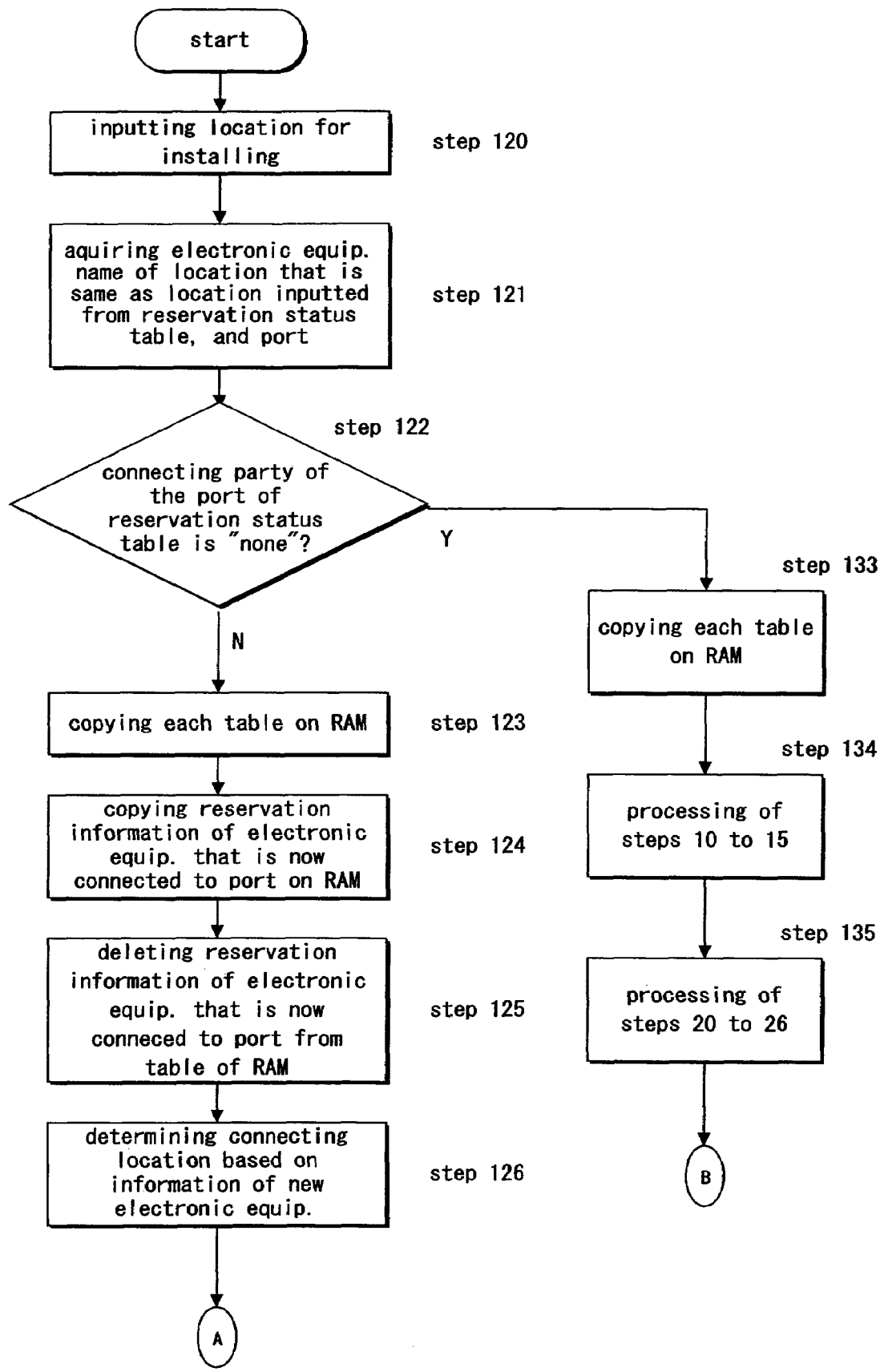
FIG. 35 (a)-FIG. 35(b) are flowcharts for the resource management server in the embodiment of the present invention.
Figure 35B:
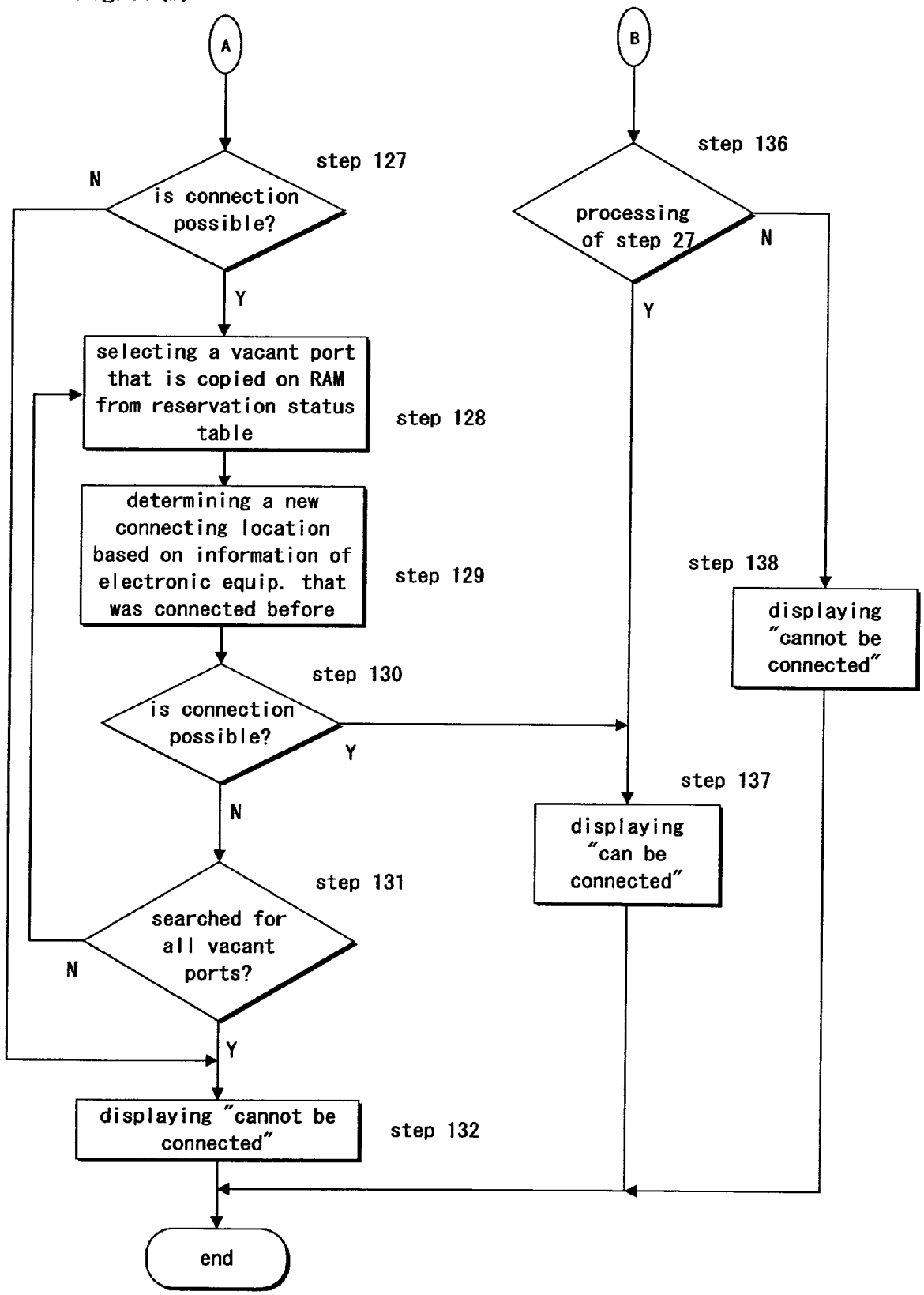

In this case, executing the procedures illustrated in FIG. 35 may designate a port to which the other electronic equipment should be moved, as shown in FIG. 34.

At step 120 in FIG. 35, the resource management server 5 inputs the port location where the new electronic equipment is to be installed from the user.

At step 121, the resource management server 5 searches the reservation status table 7 and obtains the information on the electronic equipment that is connected to the corresponding port.

At step 122, the resource management server 5 checks whether the connecting party of this electronic equipment is "none."

When not "none" at step 122, at step 123, the resource management server 5 copies the tables 6 through 8 into the RAM 32, and at step 124, copies the reservation information on the electronic equipment connected to the corresponding port into the RAM 32, and at step 125, deletes, from the reservation status table 7, the reservation information that has been copied into the RAM 32.

At step 126, the resource management server 5 executes the same processes as steps 10 through 15 and steps 20 through 28, and determines the port to which the electronic equipment that is connected to the corresponding port is to be moved.

At step 127, the resource management server 5 checks whether the electronic equipment connected to the corresponding port is connectable to the port to which the electronic equipment is determined to be moved. When unconnectable, the resource management server 5 displays that the electronic equipment is unconnectable at step 132.

When connectable, at step 128 through step 131, the resource management server 5 repeats the same process for the port to which the electronic equipment is to be moved, the reservation information of the electronic equipment having been copied at step 124.

When the corresponding port to be connected is "none" at step 122, the resource management server 5 executes the process of steps 133 through 136.

In either case, the resource management server 5 displays that the electronic equipment is connectable (step 137) when any port is found to which the electronic equipment is moved and connectable. When not found, the resource management server 5 displays that the electronic equipment is unconnectable (steps 132 and 138).

This allows the user not only to connect the new electronic equipment to the desirable port, but also to know the port to which the electronic equipment that has already been connected to the desirable port is moved, which is convenient.

In FIG. 34, only one port is shown to which the electronic equipment that has already been connected to the desirable port is moved. When plural ports are available, a simultaneous display of the plural ports is also preferable.

Figure 36:
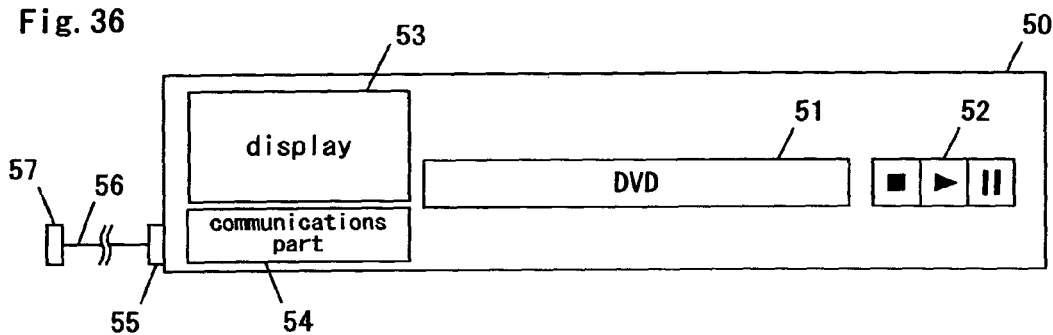
FIG. 36 is a front view of an electronic equipment in the embodiment of the present invention.

(11) FIG. 36 is a front view of an electronic equipment in the present embodiment. Here a DVD player is exemplified as the electronic equipment. The DVD player comprises a body case 50, a disk tray 51, an operation button 52, a display 53, a communications part 54, and a port 55.

Connected to the port 55 is a network cable 56 whose tip is attached with a terminal 57 that is connectable to a port of the hub.

The communications part 54 communicates with the resource management server 5 through a network path using the network cable 56.

The display 53 consists of an LCD, a fluorescent display tube, etc., and usually displays the truck, title, and playback time of the DVD, the present date, the present time, etc., the DVD being set to the disk tray 51.

However, before the usual display, the display 53 displays connection information for a while after connecting the terminal 57 to the port of the hub.

The communications part 54, when connected to the network path, notifies the resource request and the group information to the resource management server 5. Then the communications part 54 obtains the connection information from the resource management server 5 and displays the connection information on the display 53, thus notifying the user. The connection information may be notified to the user not only by the display 53 but also by voice etc.

The display 53 returns to the normal display after displaying the connection information. The connection information is displayed as shown in FIG. 38 (*a*) through FIG. 38 (*e*).

Figure 37:
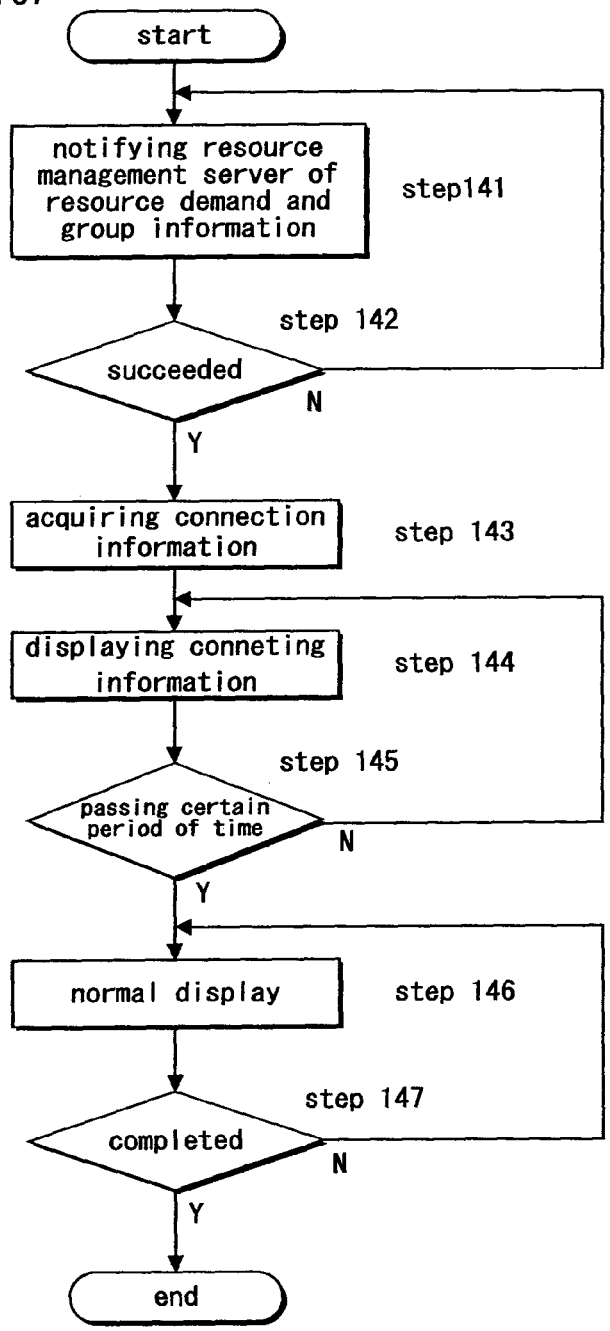
FIG. 37 is a flowchart for the electronic equipment in the embodiment of the present invention.
Figure 39A:
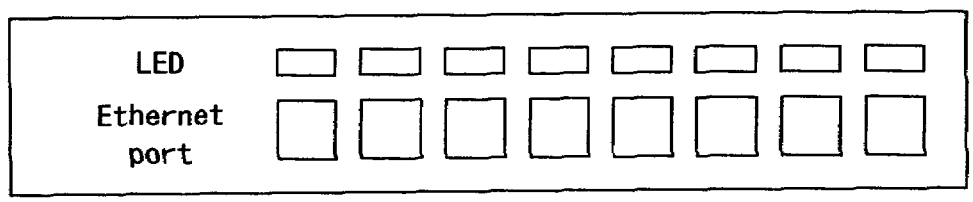
FIG. 39 (a)-FIG. 39 (d) are front views of a hub in the embodiment of the present invention.
Figure 39B:
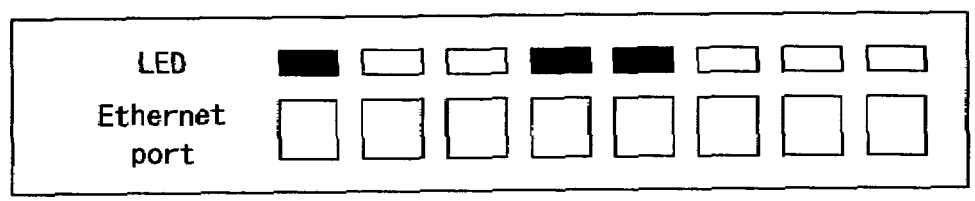
Figure 39C:
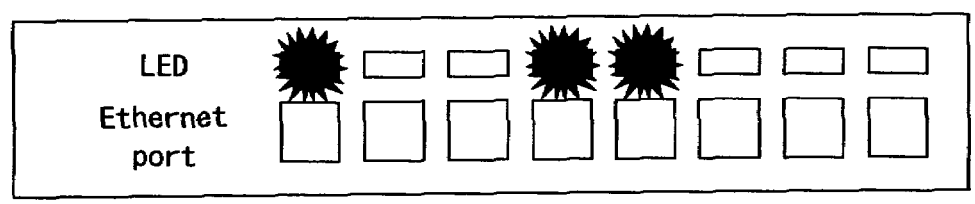
Figure 39D:
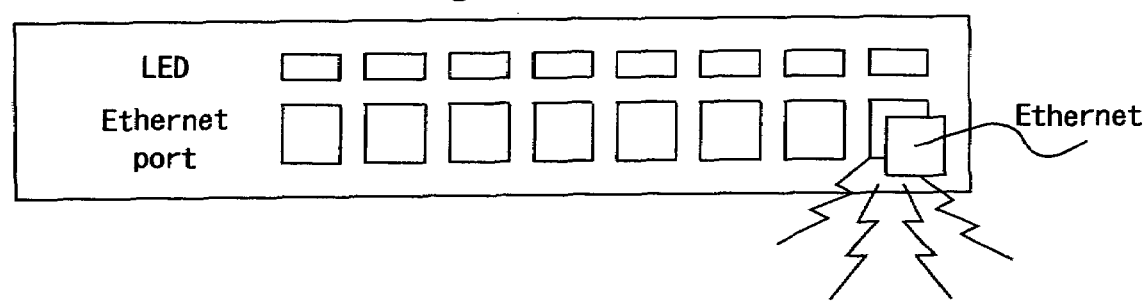

Next, the flow of the process for the DVD player is described referring to FIG. 37. First when the terminal 57 is connected to the port of the hub at step 141, the communications part 54 tries to notify the resource request and the group information to the resource management server 5.

When this notice is successfully received at step 142, the communications part 54 obtains the connection information from the resource management server 5. The obtained connection information is outputted and displayed on the display 53.

The resource management server 5 generates the connection information. When an electronic equipment has an element such as a character ROM that can generate a character string from character codes, the connection information can be sent in text format. The resource management server 5 may generate and send picture information to the communications part 54 in order to display it on the display 53. When the electronic equipment memorizes plural messages related to unique message indexes (for example, ID etc.), the resource management server 5 may send only the message indexes to the communications part 54.

The display of the connection information that is not the normal display is shown for a certain period of time (step 144). After the certain period of time, the display 53 is changed to a mode that shows the normal display (step 145). After changing the mode, the DVD player operates as an ordinal electronic equipment (step 146).

(12) It is desirable to provide the hub with such device as shown in FIG. 39. FIG. 39 (*a*) shows a situation that no electronic equipment is connected to the port.

As shown in FIG. 39 (*b*), the corresponding LED of the port that is connectable to the specific electronic equipment may be turned on, or, as shown in FIG. 39 (*c*), the corresponding LED of the port that is connectable to the specific electronic equipment may be blinked.

Or, as shown in FIG. 39 (*d*), when a specific electronic equipment is connected to a certain port but the resource request is not accepted, a negative sound (for example, a sound like "beep") may be used. On the contrary, when the resource request is accepted, an affirmative sound (for example, a sound like "ping-pong") may be used.

The above displays and sounds may be realized by providing the hub with light emitting elements like LED etc. and a loudspeaker, etc. and letting the resource management server 5 publish the notice to the corresponding hub.

(13) A mode "auto" that suggests the connecting location before connecting the electronic equipment may be added. In the mode "auto", after receiving a notice from an electronic equipment or a mobile information device such as shown in FIG. 29, the resource management server 5 refers to the reservation status table 7. Then the resource management server 5 processes steps 10 through 15 and steps 20 through 28 for the ports that have not been connected to other electronic equipments and finally shows a connectable port to the user.

A port where the electronic equipment is not connected may be searched either from the top entry or from the bottom entry of the reservation status table 7. When no port is found to which other electronic equipments are not connected, the resource management server 5 may show the user the searched result to indicate that the new electronic equipment is unconnectable. On the contrary, when a port is found to which other electronic equipment are not connected, the resource management server 5 may display the found connectable port to the user.

As described above, the resource management server 5 may also show the user that the electronic equipment already connected to the port should be moved.

The resource management system according to the present invention allows the user;

(1) to receive the service of high quality easily, since the reservation of the network necessary to receive the service is made only by connecting an electronic equipment, and (2) to receive the service easily without the advanced knowledge about the network connection, by showing an alternative location of the connection where the service is available, in case that the service is found not available when the electronic equipment is connected.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A resource management system, comprising:
a plurality of electronic equipments classified into groups according to functions of the plurality of electronic equipment;
a plurality of lower layer transmission devices with ports where said plurality of electronic equipments are operable to be connected;
an upper transmission device operable to connect said plurality of lower layer transmission devices in subordinates and to relay information among said plurality of electronic equipments being connected to said plurality of lower layer transmission devices; and
a resource management server operable to manage resources to be used for transmitting information between said upper transmission device and said plurality of lower layer transmission devices, the resource management server comprising:
at least one processor; and
a memory, wherein the at least one processor executes resource management functions including:
a storing function of storing first group information and reservation status information, the first group information defining a group to which a function of a first electronic equipment connected to a transmission apparatus belongs, the reservation status information including information with respect to an available bandwidth for connection to the transmission apparatus;
a receiving function of receiving second group information and resource reservation-requesting information from a second electronic equipment newly connected to the transmission apparatus, the second group information defining a group to which a function of the second electronic equipment belongs, the resource reservation-requesting information including information with respect to a bandwidth requested by the second electronic equipment;

a group-judging function of judging, based on the first group information and the second group information, whether or not the second electronic equipment belongs to the same group as the first electronic equipment when the receiving function receives the second group information; and a path-judging function of judging, based on the reservation status information and the resource reservation-requesting information, whether or not a communication path between the first electronic equipment and the second electronic equipment is available when the group-judging function judges that the second electronic equipment belongs to the same group as the first electronic equipment, wherein said resource management server is operable to manage information of resource reservation status and information of groups of all said electronic equipments connected to said plurality of lower layer transmission devices; when said plurality of electronic equipments are newly connected to said plurality of lower layer transmission devices, each respective electronic equipment is operable to send, to said resource management server, a notice of resource reservation request and group information of the respective electronic equipment; and when said resource management server receives the notice, said resource management server is operable to set up a path in a network connecting the newly connected electronic equipments and other electronic equipments belonging to the same group that the notice indicates, and said resource management server is operable to judge if the resource reservation request according to the notice is acceptable on the path set up in the network.

2. A resource management system according to claim 1, wherein said resource management server is operable to update reservation status of the resources when the resource reservation request according to the notice is acceptable on the path set up in the network, and operable to make at least a resource reservation for the respective electronic equipment.

3. A resource management system according to claim 1, wherein said resource management server is operable to generate picture information displaying whether the resource reservation request is acceptable or not.

4. A resource management system according to claim 1, wherein, when a resource reservation request is rejected, said resource management server is operable to generate picture information displaying a location on the network that causes the rejection.

5. A resource management system according to claim 1, wherein, when a resource reservation request is rejected, said resource management server is operable to search an alternative port through which the resource reservation request is acceptable and to generate picture information displaying a location of the searched alternative port.

6. A resource management system according to claim 1, wherein, when a resource reservation request is rejected and when there exist a plurality of grades of service quality, said resource management server is operable to make another resource reservation request with a lower grade of service quality.

7. A resource management system according to claim 1, wherein, when a resource reservation request is rejected, said resource management server is operable to cancel the present reservation status and to make a new resource reservation request.

8. A resource management system according to claim 7, wherein the new resource reservation request is made in order of demand for higher grade resources.

9. A resource management system according to claim 7, wherein the new resource reservation request is made in order of demand for lower grade resources.

10. A resource management system according to claim 7, wherein the new resource reservation request is made as directed by a user input.

11. A resource management system according to claim 1, wherein, when a resource reservation request is not actually practiced although reservation thereof is made, the resource reservation request is diverted to other services.

12. A resource management system according to claim 1, wherein the reservation status information further includes information with respect to an available bandwidth for the communication path, and wherein the path-judging function compares the available bandwidth for the communication path with the bandwidth indicated by the resource reservation-requesting information to judge whether or not the communication path is available.

13. A resource management system according to claim 12, wherein the path-judging function judges that the communication path is available when the available bandwidth for the communication path is not less than the bandwidth indicated by the resource reservation-requesting information.

14. A resource management system according to claim 13, wherein the at least one processor further executes:

a reservation function of reserving a resource requested by the second electronic equipment when the path-judging function judges that the communication path is available.

15. A resource management system according to claim 12, wherein the path-judging function judges that the communication path is not available when the available bandwidth for the communication path is less than the bandwidth indicated by the resource reservation-requesting information.

16. A resource management server according to claim 12, further comprising:

a display unit operable to display a judgment result generated by the path-judging function.

17. A resource management server according to claim 1, wherein the path-judging function specifies alternative and available communication paths existing between the second electronic equipment and another electronic equipment differing from the first and second electronic equipment when the path-judging function judges that the communication path is not available.

18. A resource management server according to claim 1, wherein the path-judging function specifies alternative and available communication paths having less quality of service among a plurality of alternative and available communication paths existing between the second electronic equipment and another plurality of electronic equipment differing from the first and second electronic equipment when the path-judging function judges that the communication path is not available.

19. A resource management server according to claim 1, wherein the transmission apparatus includes a plurality of transmission devices.

20. A resource management server according to claim 1, wherein the at least one processor further executes:

a specifying function operable to specify a location to be connected for the second electronic equipment.

21. A resource management server according to claim 1, wherein the at least one processor further executes:

a re-reservation function of cancelling a present reservation status to make a new resource reservation request when the path-judging function judges that the communication path is not available.

22. A resource management method for managing resources for a plurality of electronic equipment classified into groups according to functions of the plurality of electronic equipment, the resource management method comprising:

storing first group information and reservation status information, the first group information defining a group to which a function of a first electronic equipment connected to a transmission apparatus belongs, the reservation status information including information with respect to an available bandwidth for connection to the transmission apparatus;

receiving second group information and resource reservation-requesting information from a second electronic equipment newly connected to the transmission apparatus, the second group information defining a group to which a function of the second electronic equipment belongs, the resource reservation-requesting information including information with respect to a bandwidth requested by the second electronic equipment;

judging, based on the first group information and the second group information, whether or not the second electronic equipment belongs to the same group as the first electronic equipment when the receiving function receives the second group information; and judging, based on the reservation status information and the resource reservation-requesting information, whether or not a communication path between the first electronic equipment and the second electronic equipment is available when the group-judging function judges that the second electronic equipment belongs to the same group as the first electronic equipment.

23. A program stored on a computer-readable memory for causing a computer to perform a method of resource management for a plurality of electronic equipment classified into groups according to functions of the plurality of electronic equipment, the method comprising:

storing first group information and reservation status information, the first group information defining a group to which a function of a first electronic equipment connected to a transmission apparatus belongs, the reservation status information including information with respect to an available bandwidth for connection to the transmission apparatus;

receiving second group information and resource reservation-requesting information from a second electronic equipment newly connected to the transmission apparatus, the second group information defining a group to which a function of the second electronic equipment belongs, the resource reservation-requesting information including information with respect to a bandwidth requested by the second electronic equipment;

judging, based on the first group information and the second group information, whether or not the second electronic equipment belongs to the same group as the first electronic equipment when the receiving function receives the second group information; and judging, based on the reservation status information and the resource reservation-requesting information, whether or not a communication path between the first electronic equipment and the second electronic equipment is available when the group-judging function judges that the second electronic equipment belongs to the same group as the first electronic equipment.

* * * * *